(12) United States Patent
Dinh et al.

(10) Patent No.: US 12,425,645 B2
(45) Date of Patent: Sep. 23, 2025

(54) IMAGE DECODING APPARATUS AND METHOD AND IMAGE ENCODING APPARATUS AND METHOD

(71) Applicant: SAMSUNG ELECTRONICS CO., LTD., Suwon-si (KR)

(72) Inventors: Quockhanh Dinh, Suwon-si (KR); Kyungah Kim, Suwon-si (KR); Minsoo Park, Suwon-si (KR); Minwoo Park, Suwon-si (KR); Kwangpyo Choi, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 18/235,612

(22) Filed: Aug. 18, 2023

(65) Prior Publication Data

US 2024/0064331 A1    Feb. 22, 2024

Related U.S. Application Data

(63) Continuation of application No. PCT/KR2023/011796, filed on Aug. 10, 2023.

(30) Foreign Application Priority Data

Aug. 18, 2022 (KR) .......... 10-2022-0103413
Sep. 30, 2022 (KR) .......... 10-2022-0125777

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/176* (2014.11); *H04N 19/182* (2014.11); *H04N 19/42* (2014.11)

(58) Field of Classification Search
CPC .. H04N 19/593; H04N 19/105; H04N 19/176; H04N 19/182; H04N 19/42
See application file for complete search history.

(56) References Cited

U.S. PATENT DOCUMENTS 9,462,272 B2    10/2016 Lee et al.
9,497,454 B2 *  11/2016 Song ................... H04N 19/176
(Continued)

FOREIGN PATENT DOCUMENTS

CN    108259897 A      7/2018
EP    4142289 A1 *    3/2023  ........... G06N 3/0455
(Continued)

OTHER PUBLICATIONS

Thierry Dumas et al., "Iterative training of neural networks for intra prediction"; arXiv:2003.06812v2; Nov. 25, 2020 (Year: 2020).*
(Continued)

*Primary Examiner* — Dramos Kalapodas
(74) *Attorney, Agent, or Firm* — Sughrue Mion, PLLC

(57) ABSTRACT

An image decoding method and apparatus obtain intra prediction feature data of a current block from a bitstream, determine an intra flow indicating a reference pixel of a current pixel in the current block, by applying the intra prediction feature data, neighboring pixels of the current block, and coding context information of the current block to a neural network, obtain a predicted pixel of the current pixel based on the intra flow of the current block, and reconstruct the current block based on the predicted pixel.

15 Claims, 23 Drawing Sheets

(51) Int. Cl.
*H04N 19/176* (2014.01)
*H04N 19/182* (2014.01)
*H04N 19/42* (2014.01)

(56) References Cited

U.S. PATENT DOCUMENTS

| | | |
|---|---|---|
| 10,448,011 B2 | 10/2019 | Liu et al. |
| 11,265,540 B2 | 3/2022 | Na et al. |
| 11,405,638 B2 | 8/2022 | Zhao et al. |
| 11,979,564 B2 | 5/2024 | Bokov et al. |
| 2017/0238012 A1 | 8/2017 | Min et al. |
| 2020/0092550 A1 | 3/2020 | Piao |
| 2020/0228829 A1 | 7/2020 | Jeon et al. |
| 2020/0413085 A1* | 12/2020 | Robert ............... H04N 19/513 |
| 2021/0344929 A1 | 11/2021 | Choi et al. |
| 2022/0094977 A1 | 3/2022 | Kim et al. |
| 2022/0232206 A1 | 7/2022 | Lee et al. |
| 2023/0064033 A1 | 3/2023 | Seregin et al. |
| 2023/0353764 A1* | 11/2023 | Ikonin .................. G06N 3/047 |

FOREIGN PATENT DOCUMENTS

| | | |
|---|---|---|
| KR | 10-1712107 B1 | 3/2017 |
| KR | 10-2019-0092382 A | 8/2019 |
| KR | 10-2020-0000548 A | 1/2020 |
| KR | 10-2020-0084767 A | 7/2020 |
| KR | 10-2154742 B1 | 9/2020 |
| KR | 10-2021-0098913 A | 8/2021 |

OTHER PUBLICATIONS

J. Pfaff et al., "Neural network based intra prediction for video coding"; Applications of Digital Image Processing XLI, SPIE vol. 10752, 1075213-1, © 2018 SPIE, doi: 10.1117/12.2321273 (Year: 2018).*

Benjamin Bross et al., "Overview of the Versatile Video Coding (VVC) Standard and Its Applications", IEEE Transactions on Circuits and Systems for Video Technology, vol. 31, No. 10, pp. 3736-3764, Oct. 2021, doi: 10.1109/TCSVT.2021.3101953.

Jonathan Pfaff et al., "Intra Prediction and Mode Coding in VVC", IEEE Transactions on Circuits and Systems for Video Technology, vol. 31, No. 10, pp. 3834-3847, Oct. 2021, doi: 10.1109/TCSVT.2021.3072430.

Thierry Dumas et al., "Iterative Training of Neural Networks for Intra Prediction", IEEE Transactions on Image Processing, vol. 30, pp. 697-711, Nov. 25, 2020, doi: 10.1109/TIP.2020.3038348, arXiv:2003.06812 [eess.IV].

International Search Report and Written Opinion issued Nov. 6, 2023 by the International Searching Authority in International Patent Application No. PCT/KR2023/011796 (PCT/ISA/220, PCT/ISA/210 and PCT/ISA/237).

* cited by examiner

IMAGE DECODING APPARATUS AND METHOD AND IMAGE ENCODING APPARATUS AND METHOD

CROSS-REFERENCE TO RELATED APPLICATIONS

This application is a bypass continuation application, under 35 U.S.C § 111(a), of International Application No. PCT/KR2023/011796 designating the United States, filed on Aug. 10, 2023, in the Korean Intellectual Property Receiving Office, which claims priority from Korean Patent Application No. 10-2022-0103413, filed on Aug. 18, 2022, and Korean Patent Application No. 10-2022-0125777, filed on Sep. 30, 2022, in the Korean Intellectual Property Office, the disclosures of which are hereby incorporated by reference herein in their entireties.

BACKGROUND

1. Field

The disclosure relates to an image decoding method, an image decoding apparatus, an image encoding method and an image encoding apparatus, and more particularly, to a method and apparatus for performing intra prediction.

2. Description of Related Art

In image processing technology, codecs, such as H.264 Advanced Video Coding (AVC) and High Efficiency Video Coding (HEVC), may be used for processing an image. In such codecs, an image may be divided into blocks and each of the blocks may be prediction-encoded and prediction-decoded through inter prediction or intra prediction.

Intra prediction is a method of compressing an image by removing spatial redundancy in the image, and inter prediction is a method of compressing an image by removing temporal redundancy between images.

Intra prediction is performed by predicting all pixels in a particular block in one intra prediction direction based on one intra prediction mode. Moreover, in the intra prediction operation, interpolation of a reference pixel may be performed by using a fixed filter coefficient of a predetermined filter.

Recently, technologies for encoding/decoding an image by using artificial intelligence (AI) have been proposed, and a method of effectively encoding/decoding an image by performing intra prediction by using AI, for example, a neural network, has been utilized.

SUMMARY

An embodiment of the disclosure provides a method and apparatus for performing intra prediction more efficiently.

According to an embodiment of the disclosure, an image decoding method may include obtaining intra prediction feature data of a current block from a bitstream, obtaining intra flow information indicating a reference pixel of a current pixel in the current block, based on the intra prediction feature data, neighboring pixels of the current block, and coding context information of the current block, obtaining a predicted pixel of the current pixel based on the intra flow information of the current block, and reconstructing the current block based on the predicted pixel.

According to an embodiment of the disclosure, an image decoding apparatus may include a memory storing one or more instructions, and at least one processor configured to operate according to the one or more instructions. The at least one processor may be configured to obtain intra prediction feature data of a current block from a bitstream. The at least one processor may be configured to obtain intra flow information indicating a reference pixel of a current pixel in the current block, based on the intra prediction feature data, neighboring pixels of the current block, and coding context information of the current block. The at least one processor may be configured to obtain a predicted pixel of the current pixel based on the intra flow information of the current block. The at least one processor may be configured to reconstruct the current block based on the predicted pixel.

According to an embodiment of the disclosure, an image encoding method may include obtaining, based on an original pixel of a current block, first neighboring pixels of the current block, and coding context information of the current block, intra prediction feature data of the current block and intra flow information indicating a reference pixel corresponding to the original pixel of the current block, obtaining a predicted pixel of the original pixel based on the intra flow information of the current block, and encoding the intra prediction feature data by reconstructing the current block based on the predicted pixel.

According to an embodiment of the disclosure, an image encoding apparatus may include a memory storing one or more instructions, and at least one processor configured to operate according to the one or more instructions. The at least one processor may be configured to obtain, based on an original pixel of a current block, first neighboring pixels of the current block, and coding context information of the current block, intra prediction feature data of the current block and intra flow information indicating a reference pixel corresponding to the original pixel of the current block. The at least one processor may be configured to obtain a predicted pixel of the original pixel based on the intra flow information of the current block. The at least one processor may be configured to encode the intra prediction feature data by reconstructing the current block based on the predicted pixel.

According to an embodiment of the disclosure, an image decoding method may include obtaining, based on coding context information and first neighboring pixels of a current block, intra flow information indicating a reference pixel corresponding to a current pixel in the current block and weight information of the reference pixel and a plurality of second neighboring pixels adjacent to the reference pixel, obtaining a predicted pixel of the current pixel based on the intra flow information and the weight information, and reconstructing the current block based on the predicted pixel.

According to an embodiment of the disclosure, an image decoding apparatus may include a memory storing one or more instructions, and at least one processor configured to operate according to the one or more instructions. The at least one processor may be configured to obtain, based on coding context information and first neighboring pixels of a current block, intra flow indicating a reference pixel corresponding to a current pixel in the current block and weight information of the reference pixel and a plurality of second neighboring pixels adjacent to the reference pixel. The at least one processor may be configured to obtain a predicted pixel of the current pixel based on the intra flow information and the weight information. The at least one processor may be configured to reconstruct the current block based on the predicted pixel.

According to an embodiment of the disclosure, an image encoding method may include obtaining, based on coding context information and first neighboring pixels of a current block, intra flow information indicating a reference pixel corresponding to a current pixel in the current block and weight information of the reference pixel and a plurality of second neighboring pixels adjacent to the reference pixel, obtaining a predicted pixel of the current pixel based on the intra flow information and the weight information, and encoding the current block based on the predicted pixel.

According to an embodiment of the disclosure, an image encoding apparatus may include a memory storing one or more instructions, and at least one processor configured to operate according to the one or more instructions. The at least one processor may be configured to obtain, based on coding context information and neighboring pixels of a current block, intra flow information indicating a reference pixel corresponding to a current pixel in the current block and weight information of the reference pixel and a plurality of second neighboring pixels adjacent to the reference pixel. The at least one processor may be configured to obtain a predicted pixel of the current pixel based on the intra flow information and the weight information. The at least one processor may be configured to encode the current block based on the predicted pixel.

BRIEF DESCRIPTION OF DRAWINGS

Embodiments will be more clearly understood from the following detailed description taken in conjunction with the accompanying drawings in which.

DETAILED DESCRIPTION

Figure 1:
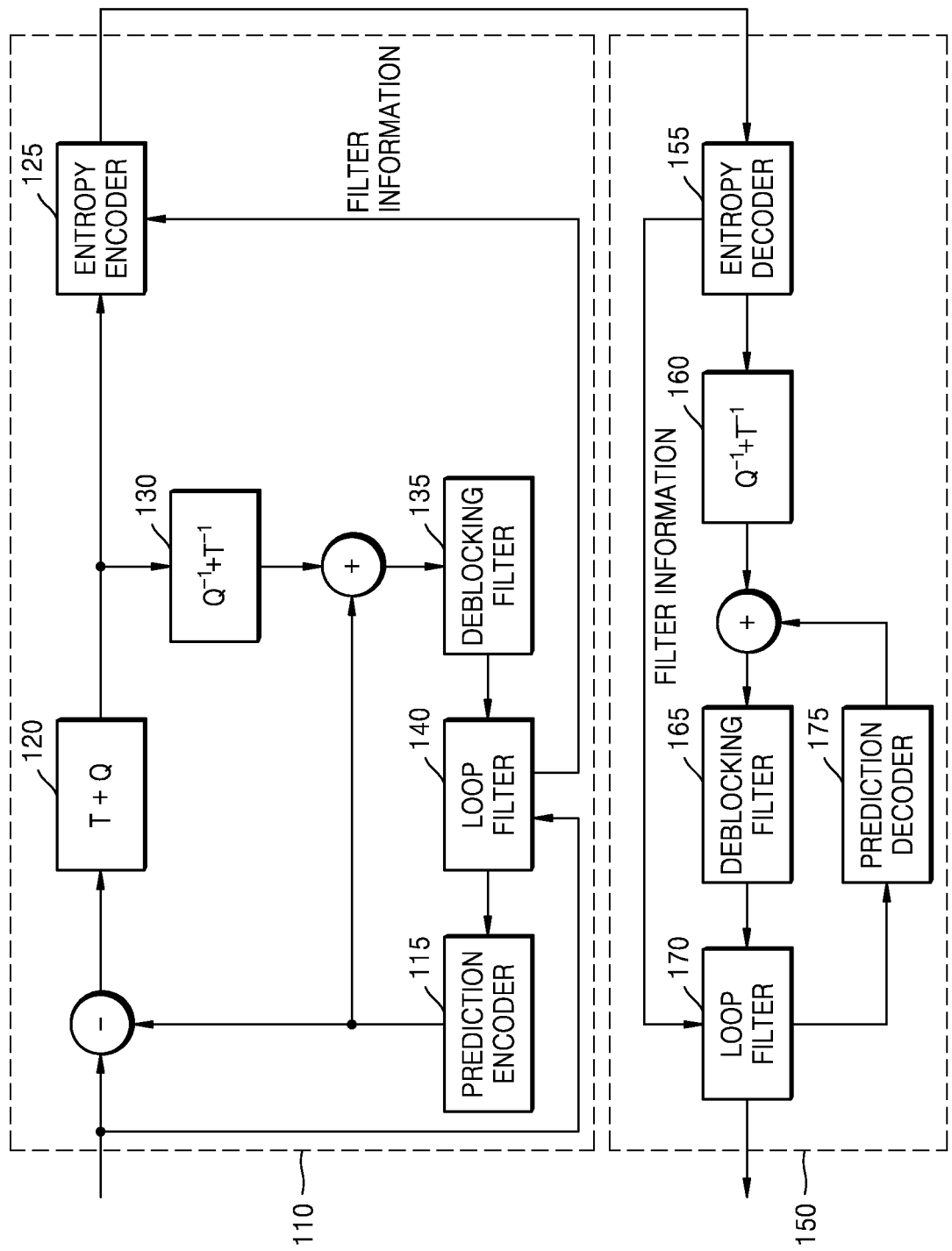
FIG. 1 is a diagram illustrating an image encoding and decoding process.

All terms used herein are briefly described and embodiments of the disclosure are described fully hereinafter. These embodiments are example embodiments, and thus, the disclosure is not limited thereto and may be realized in various other forms. As is traditional in the field, embodiments may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Throughout the disclosure, the expression "at least one of a, b or c" indicates only a, only b, only c, both a and b, both a and c, both b and c, all of a, b, and c, or variations thereof.

The disclosure may include various embodiments and modifications, and particular embodiments thereof are illustrated in the drawings and will be described herein in detail. However, it should be understood that the disclosure is not limited to particular embodiments and includes all modifications, equivalents, and substitutions included in the spirit and scope of the disclosure.

In the following description of the embodiments, detailed descriptions of the related art will be omitted when it is deemed that they may unnecessarily obscure the subject matters of the disclosure. Also, numbers (e.g., first and second) used in the process of describing embodiments of the disclosure are merely identification symbols for distinguishing an element from another element.

Also, herein, when an element is referred to as being "connected" or "coupled" to another element, the element may be directly connected or coupled to the other element or may also be indirectly connected or coupled to the other element through one or more other intervening elements therebetween unless otherwise specified.

Also, herein, as for elements represented as " . . . portions (units)", " . . . modules", or the like, two or more elements may be combined into one element, or one element may be divided into two or more elements for each subdivided function. Also, each element described below may additionally perform some or all of the functions of other elements in addition to its main functions, and some of the main functions of each element may be exclusively performed by other elements.

Also, herein, an "image or picture" may refer to a still image (or frame), a moving image including a plurality of consecutive still images, or a video.

Herein, a "neural network" may be a representative example of an artificial neural network model simulating a cranial nerve and is not limited to an artificial neural network model using a particular algorithm. The neural network may also be referred to as a deep neural network.

Herein, a "parameter" may be a value used in an operation process of each layer constituting the neural network and may be used, for example, when an input value is applied to a certain operation expression. The parameter may be a value set as a result of training and may be updated through separate training data as needed.

Herein, "feature data" may refer to data obtained by processing input data by a neural network or a neural network-based encoder. The feature data may be one-dimensional or two-dimensional data. However, the disclosure is not limited thereto. The feature data may include one-dimensional or two-dimensional data including various samples. The feature data may also be referred to as a latent tensor or a latent representation. The feature data may represent a feature latent in data output by a neural network-based decoder.

Herein, a "sample" may refer to data to be processed, as data allocated to a sampling position in one-dimensional or two-dimensional data such as an image, a block, or feature data. For example, the sample may include a pixel in a two-dimensional image. The two-dimensional data may also be referred to as a "map".

Also, herein, a "current block" may refer to a block that is to be currently processed. The current block may be a slice, a tile, a maximum coding unit, a coding unit, a prediction unit, or a transformation unit split from a current image.

Also, herein, an "intra flow" may refer to a reference pixel indicated by each pixel in the block.

Before describing an image decoding method, an image decoding apparatus, an image encoding method, and an image encoding apparatus according to an embodiment of the disclosure, an image encoding and decoding process will be described with reference to FIGS. 1 and 2.

FIG. 1 is a diagram illustrating an image encoding and decoding process.

In the image encoding and decoding process, an encoding apparatus 110 may transmit, to a decoding apparatus 150, a bitstream generated by encoding an image and the decoding apparatus 150 may reconstruct the image by receiving and decoding the bitstream.

For example, the encoding apparatus 110 may include a prediction encoder 115, a transformer and quantizer 120, an entropy encoder 125, an inverse quantizer and inverse transformer 130, a deblocking filter 135, and a loop filter 140, and the decoding apparatus 150 may include an entropy decoder 155, an inverse quantizer and inverse transformer 160, a deblocking filter 165, a loop filter 170, and a prediction decoder 175. Particularly, in the encoding apparatus 110, the prediction encoder 115 may output a predicted block through inter prediction and intra prediction and the transformer and quantizer 120 may output a quantized transformation coefficient by transforming and quantizing residual samples of a residual block between the predicted block and a current block. The entropy encoder 125 may output a bitstream by encoding the quantized transformation coefficient.

The quantized transformation coefficient may be reconstructed by a residual block including residual samples in the spatial domain, through the inverse quantizer and inverse transformer 130. A reconstructed block obtained by adding the predicted block and the residual block may be output as a filtered block through a deblocking filter 135 and a loop filter 140. A reconstructed image including the filtered block may be used as a reference image of a next input image in the prediction encoder 115.

The bitstream received by the decoding apparatus 150 may be reconstructed by a residual block including residual samples in the spatial domain, through the entropy decoder 155 and the inverse quantizer and inverse transformer 160. A reconstructed block may be generated by combining the residual block and the predicted block output from the prediction decoder 175, and the reconstructed block may be output as a filtered block through the deblocking filter 165 and the loop filter 170. A reconstructed image including the filtered block may be used as a reference image for a next image in the prediction decoder 175.

The loop filter 140 of the encoding apparatus 110 may perform loop filtering by using filter information input according to a user input or system setting. The filter information used by the loop filter 140 may be transmitted to the decoding apparatus 150 through the entropy encoder 125. The loop filter 170 of the decoding apparatus 150 may perform loop filtering based on filter information input from the entropy decoder 155.

In the image encoding and decoding process, an image may be divided and encoding and decoding may be performed on a block divided from the image. For example, the image may be hierarchically divided. The block divided from the image will be described below with reference to FIG. 2.

Figure 2:
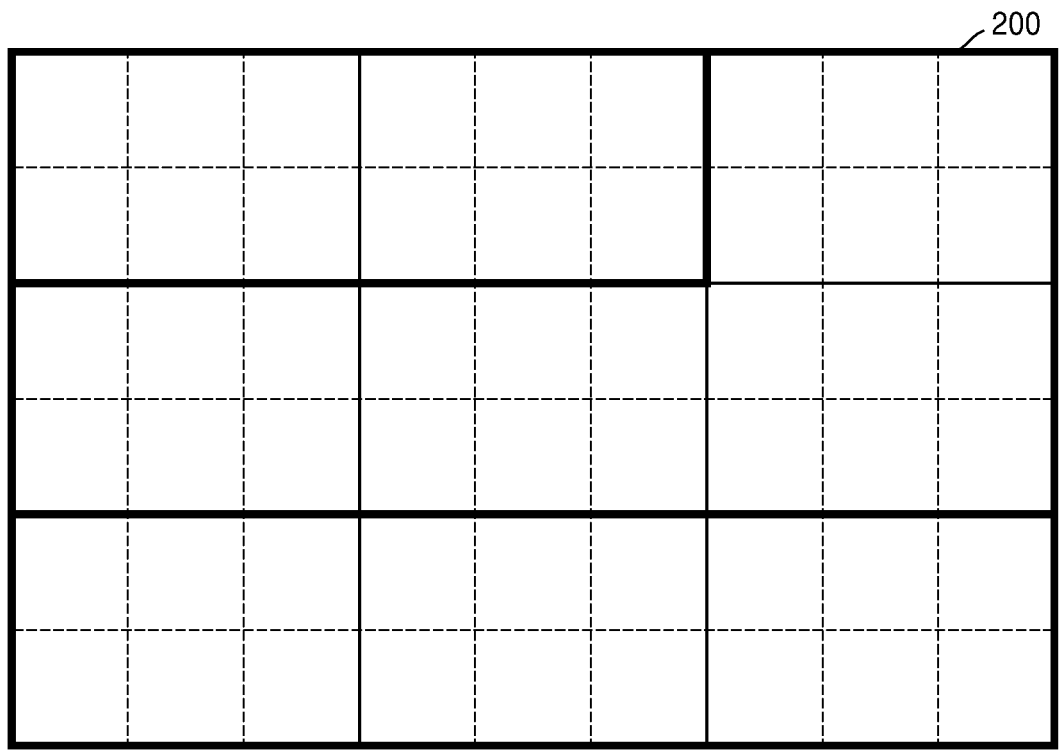
FIG. 2 is a diagram illustrating blocks split from an image according to a tree structure.

FIG. 2 is a diagram illustrating blocks split (or divided) from an image 200 according to a tree structure.

According to an embodiment of the disclosure, an image 200 may be split into one or more slices or one or more tiles. A slice may include a plurality of tiles. For example, the image 200 may be divided into one or more slices or one or more tiles.

A slice or a tile may be a sequence of one or more maximum coding units (CUs).

A maximum coding unit may be split into one or more coding units. A coding unit may be a reference block for determining a prediction mode. In other words, it may be determined whether an intra prediction mode or an inter prediction mode is applied to each coding unit. Herein, the maximum coding unit may be referred to as a maximum coding block and the coding unit may be referred to as a coding block.

The size of the coding unit may be equal to or smaller than the size of the maximum coding unit. Because the maximum coding unit is a coding unit having a maximum size, it may also be referred to as a coding unit. Intra prediction may be referred to as "intra-prediction" and inter prediction may be referred to as "inter-prediction."

One or more prediction units for intra prediction or inter prediction may be determined from the coding unit. The size of the prediction unit may be equal to or smaller than the size of the coding unit.

Also, one or more transformation units for transformation and quantization may be determined from the coding unit. The size of the transformation unit may be equal to or smaller than the size of the coding unit. The transformation unit may be a reference block for transformation and quantization and residual samples of the coding unit may be transformed and quantized for each transformation unit in the coding unit.

Herein, the current block may be a slice, a tile, a maximum coding unit, a coding unit, a prediction unit, or a transformation unit split (or divided) from the image 200. Also, a lower block (of the current block may be a block split from the current block, and for example, when the current block is a maximum coding unit, the lower block may be a coding unit, a prediction unit, or a transformation unit. Also, an upper block of the current block may be a block including the current block as a portion thereof and for example, when the current block is a maximum coding unit, the upper block may be a picture sequence, a picture, a slice, or a tile. That is, the lower block of the current block and the upper block of the current block may refer to a block according to an hierarchy in which the image 200 is divided. For example, the lower block of the current block may refer to lower units, which are further subdivided units of the current block. On the other hand, the upper block of the current block may refer to higher units, of which the current block is a part.

Hereinafter, an image decoding method, an image decoding apparatus, an image encoding method, and an image encoding apparatus according to an embodiment of the disclosure will be described with reference to FIGS. 3 to 23.

Figure 3:
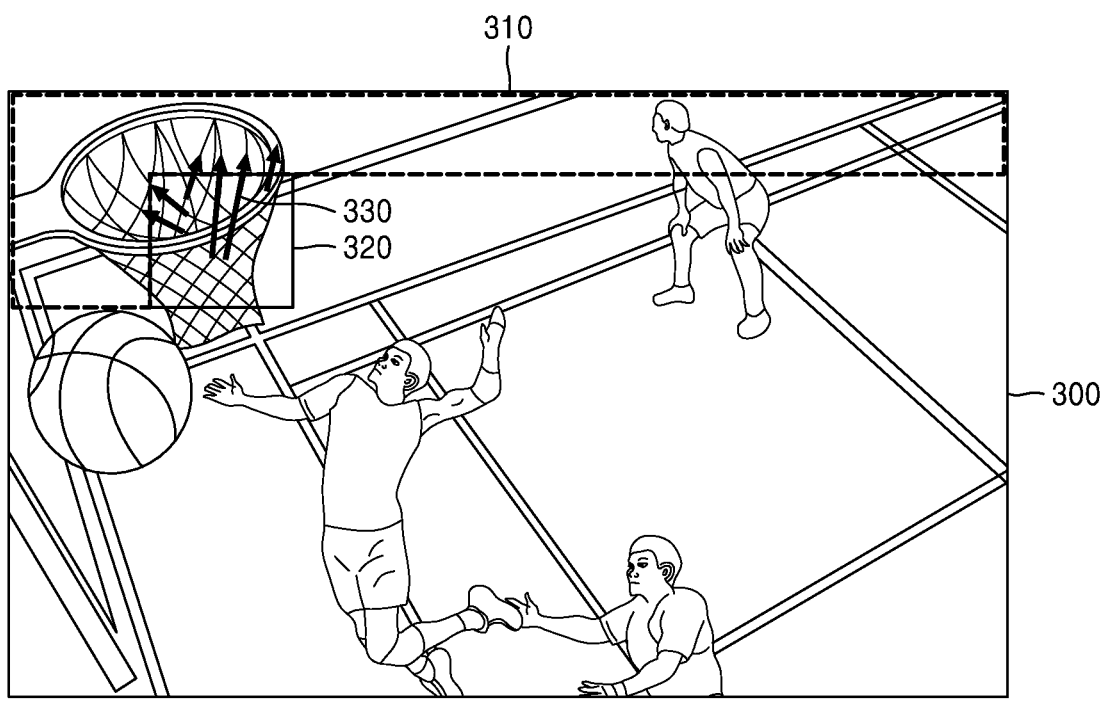
FIG. 3 is a diagram illustrating an intra flow according to an embodiment of the disclosure.

FIG. 3 is a diagram illustrating an intra flow according to an embodiment of the disclosure.

Performing prediction on all pixels in a block in one intra prediction direction according to one intra prediction mode may not cover various type of video content. All the pixels in the block may have different prediction directions indicating the best reference pixels for the respective pixels.

Referring to FIG. 3, pixels in a current block 320 of a current image 300 may have an intra flow 330 representing different prediction directions indicating a reference pixel in a neighboring reference area 310. Intra flow may be referred to as "intra-flow".

The intra flow 330 may be represented by a first vector representing the difference between the x component and the y component between the current pixel and the reference pixel, a second vector of the distance r component between the current pixel and the reference pixel and the angle θ component between the current pixel and the reference pixel with respect to the x axis, or an angle between the current pixel and the reference pixel. According to an embodiment of the disclosure, when the intra flow 330 is represented only by an angle between the current pixel and the reference pixel, a reference pixel located first on the boundary of the current block according to the angle with respect to the current pixel may be determined as a reference pixel. However, the disclosure is not limited thereto, and as such, according to an embodiment of the disclosure, the intra flow 330 may include one or more of the first vector, the second vector and the angle. According to an embodiment of the disclosure, the intra flow 330 may include one or more of the first vector, the second vector and the angle along with other information.

Figure 4:
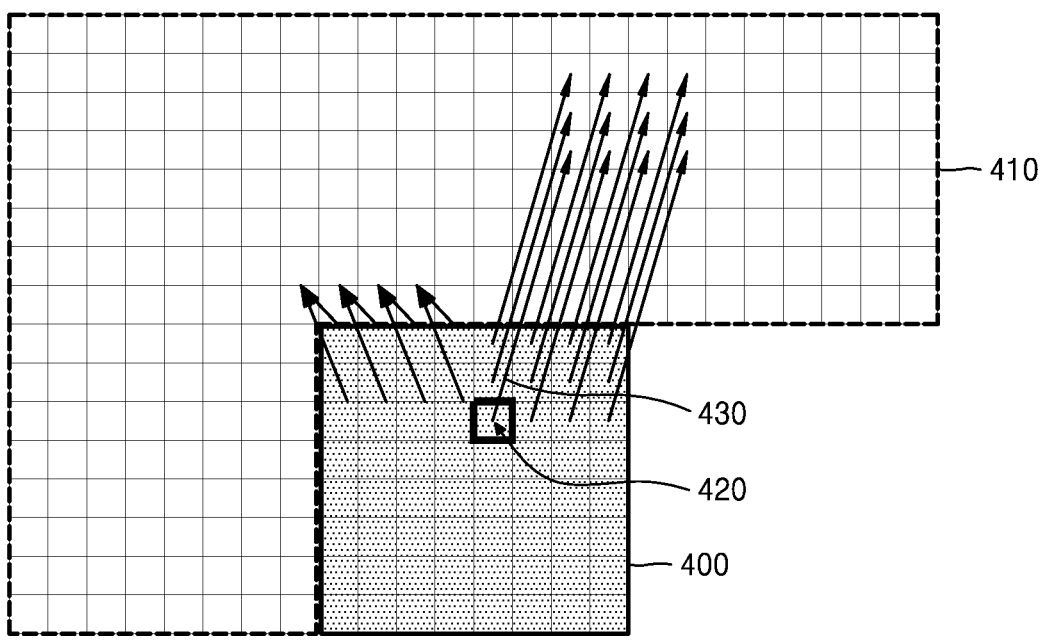
FIG. 4 is a diagram for describing an intra flow according to an embodiment of the disclosure.

FIG. 4 is a diagram for describing an intra flow according to an embodiment of the disclosure.

Referring to FIG. 4, the intra flow may be a flow representing a reference pixel of each pixel to be predicted.

According to an embodiment of the disclosure, a current pixel 420 of a current block 400 may have an intra flow 430 indicating a reference pixel of a neighboring reference area 410 corresponding to the current pixel 420 of the current block 400. That is, each of the pixels in the current block 400 may have a reference pixel indicated by an intra flow. According to an embodiment of the disclosure, each of the pixels in the current block 400 may have an independent or separate intra flow 430 indicating a reference pixel corresponding to the respective pixel in the current block 400. For example, a first pixel in the current block 400 may have a first intra flow 430 indicating a first reference pixel corresponding to the first pixel and a second pixel in the current block 400 may have a second intra flow 430 indicating a second reference pixel corresponding to the second pixel. Although the first intra flow and the second intra flow is used for explanation, the disclosure is not limited thereto, and as such, the first intra flow and the second intra flow may be reference to as first flow and second flow, which are contained in the intra flow. That is, the intra flow may contain a flow ($f_i$) pointing to reference pixel of each pixel ($p_i$) to be predicted in the current block, where i is an integer.

According to an embodiment of the disclosure, an intra flow may not be required for a pixel on the boundary of a block but may be inside a reference block when necessary. As an example, the intra flow may not be necessary for the pixel on the boundary of reference block in the case of a block copy in screen content.

According to an embodiment of the disclosure, in an image encoding process, an image encoding apparatus may determine an intra flow representing a reference pixel corresponding to each pixel in a current block, obtain a predicted pixel of an original pixel by using the intra flow, reconstruct the current block based on the predicted pixel, entropy-encode information about the intra flow through cost calculation, and transmit a resulting bitstream to an image decoding apparatus. The cost calculation operation may be Sum of Transform Difference (SATD) or Rate Distortion Optimization (RDO) calculation. However, the disclosure is not limited thereto, and as such, according to an embodiment of the disclosure, other calculations may be performed. Also, in an image decoding process, the image decoding apparatus may obtain information about the intra flow from the bitstream, determine an intra flow representing a reference pixel corresponding to each pixel in the current block based on the information about the intra flow, obtain a predicted pixel of a current pixel in the current block by using the intra flow, and reconstruct the current block based on the predicted pixel.

Figure 5:
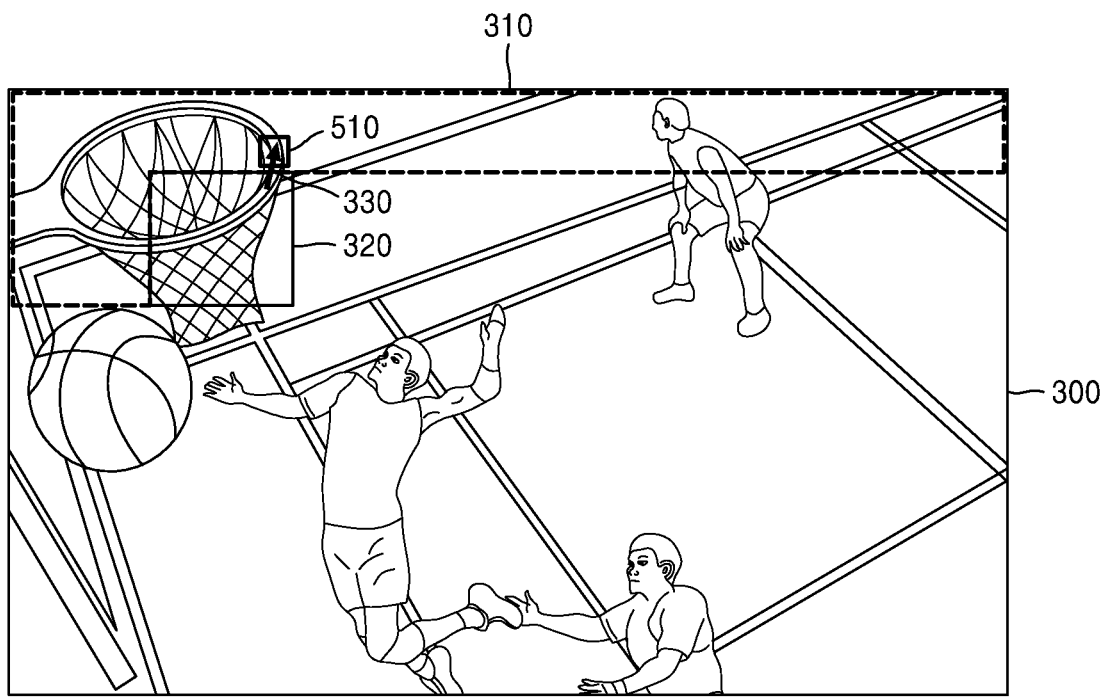
FIG. 5 is a diagram illustrating weights for a reference pixel indicated by an intra flow and neighboring pixels of the reference pixel, according to an embodiment of the disclosure.

FIG. 5 is a diagram illustrating weights for a reference pixel indicated by an intra flow and neighboring pixels of the reference pixel, according to an embodiment of the disclosure.

Referring to FIG. 5, a reference pixel of a current pixel may be determined according to an intra flow 330 indicating the reference pixel in a neighboring reference area 310 of the current pixel in a current block 320 of a current image 300. In this case, neighboring pixels of the reference pixel represented by the intra flow 330 may include a plurality of references similar to a pixel to be predicted. A final predicted pixel may be obtained by mixing and using the reference pixel and neighboring pixels 510 of the reference pixel, which is described in more detail below with reference to FIG. 6.

Figure 6:
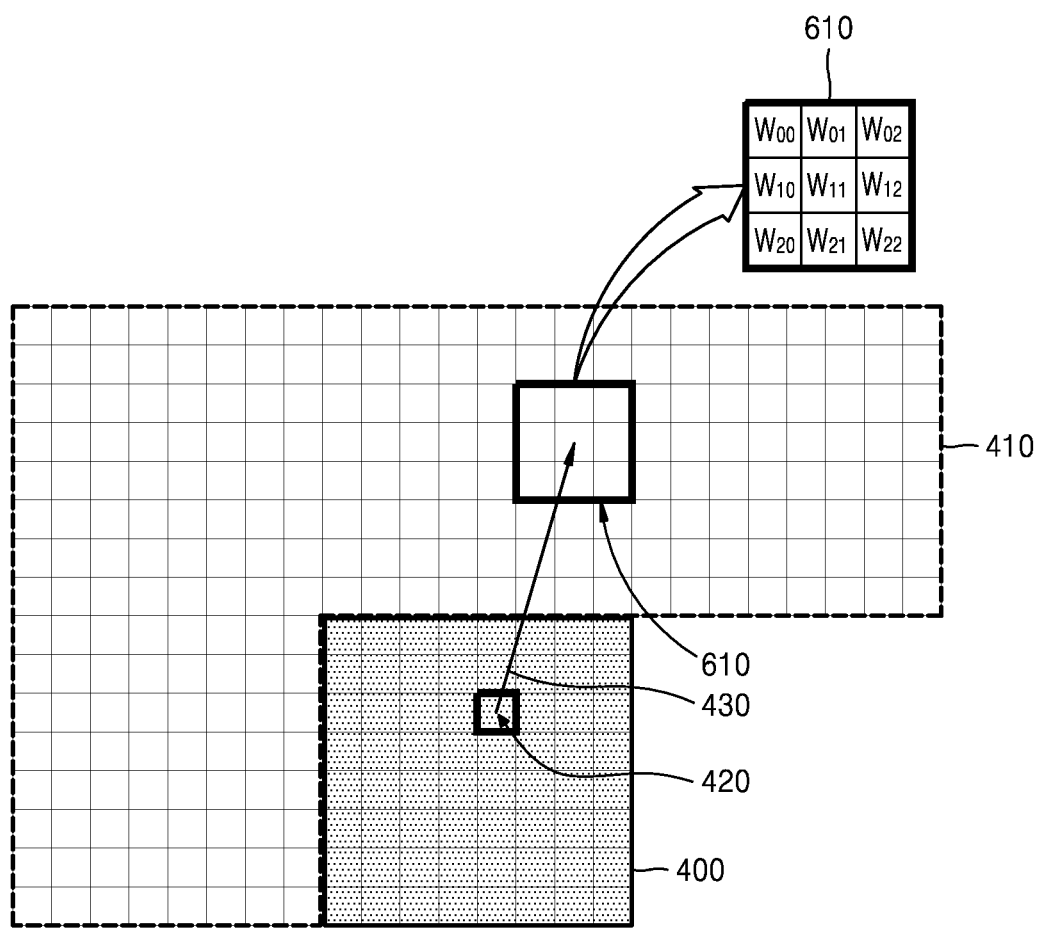
FIG. 6 is a diagram for describing weights for a reference pixel indicated by an intra flow and neighboring pixels of the reference pixel, according to an embodiment of the disclosure.

FIG. 6 is a diagram for describing weights for a reference pixel indicated by an intra flow and neighboring pixels reference pixel, according to an embodiment of the disclosure.

Referring to FIG. 6, a reference pixel in a neighboring reference area 410 of a current block 400 may be determined according to an intra flow 430 indicating a reference pixel of a current pixel 420 of the current block 400. In this case, a reference pixel and neighboring pixels 610 of the reference pixel may be determined. A final predicted pixel may be obtained by using the determined reference pixel and the neighboring pixels 610 to calculate a weighted average. For example, in FIG. 6, the reference pixel may be pixel $W_{11}$, and the neighboring pixels may be $W_{00}$, $W_{01}$, $W_{02}$, $W_{10}$, $W_{12}$, $W_{20}$, $W_{21}$, and $W_{22}$. The weight of the reference pixel is $W_{11}$, the weight of the upper left neighboring pixel of the reference pixel is $W_{00}$, the weight of the upper neighboring pixel of the reference pixel is $W_{01}$, the weight of the upper right neighboring pixel of the reference pixel is $W_{02}$, the weight of the left neighboring pixel of the reference pixel is $W_{10}$, the weight of the right neighboring pixel of the reference pixel is $W_{12}$, the weight of the lower left neighboring pixel of the reference pixel is $W_{20}$, the weight of the lower neighboring pixel of the reference pixel is $W_{21}$, and the weight of the lower right neighboring pixel of the reference pixel is $W_{22}$.

Accordingly, a final predicted pixel (or pixel value) $\tilde{p}$ may be calculated as a weighted average according to Equation 1 below.

$$\tilde{p} = \sum_{(i,j) \in W} w_{ij} \hat{p}_{ij} \qquad \text{[Equation 1]}$$

Here, W is a reference window representing pixels around the reference pixel and has a size of 3×3 in FIG. 6, $W_{ij}$ is a weight of row i and column j, and $\hat{p}_{ij}$ is a sample value of a pixel of row i and column j.

The weight may represent a contribution of each reference pixel to the final predicted pixel, wherein the weight may be great when the contribution is great and the weight may be small when the contribution is small.

The reference window may have a size of 5×5 or 7×7 instead of 3×3 and may have a rectangular shape such as 3×5 or 5×3 instead of a square shape; however, the disclosure is not limited thereto. As such, the size and shape of the reference window may vary.

The reference window may have a predetermined size, and weight information may be used for a weighted average based on the reference window of the predetermined size.

According to an embodiment of the disclosure, in an image encoding process, an image encoding apparatus may determine an intra flow representing a reference pixel corresponding to each pixel in a current block and weight information about the reference pixel represented by the intra flow and neighboring pixels of the reference pixel, obtain a predicted pixel of an original pixel by using the intra flow and the weight information, reconstruct the current block based on the predicted pixel, entropy-encode information about the intra flow and the weight information through cost calculation, and transmit a resulting bitstream to an image decoding apparatus. The cost calculation may be Sum of Transform Difference (SATD) or Rate Distortion Optimization (RDO) calculation. Also, in an image decoding process, the image decoding apparatus may obtain information about the intra flow and the weight information from the bitstream, determine an intra flow representing a reference pixel corresponding to each pixel in the current block based on the information about the intra flow and the weight information, obtain a predicted pixel of a current pixel in the current block by using the intra flow and the weights, and reconstruct the current block based on the predicted pixel.

Hereinafter, an image encoding method and apparatus and an image decoding method and apparatus for determining an intra flow or an intra flow and weight information by using a neural network and obtaining a predicted pixel based on the intra flow or the intra flow and the weight information will be described below with reference to FIGS. 7 to 23.

Figure 7:
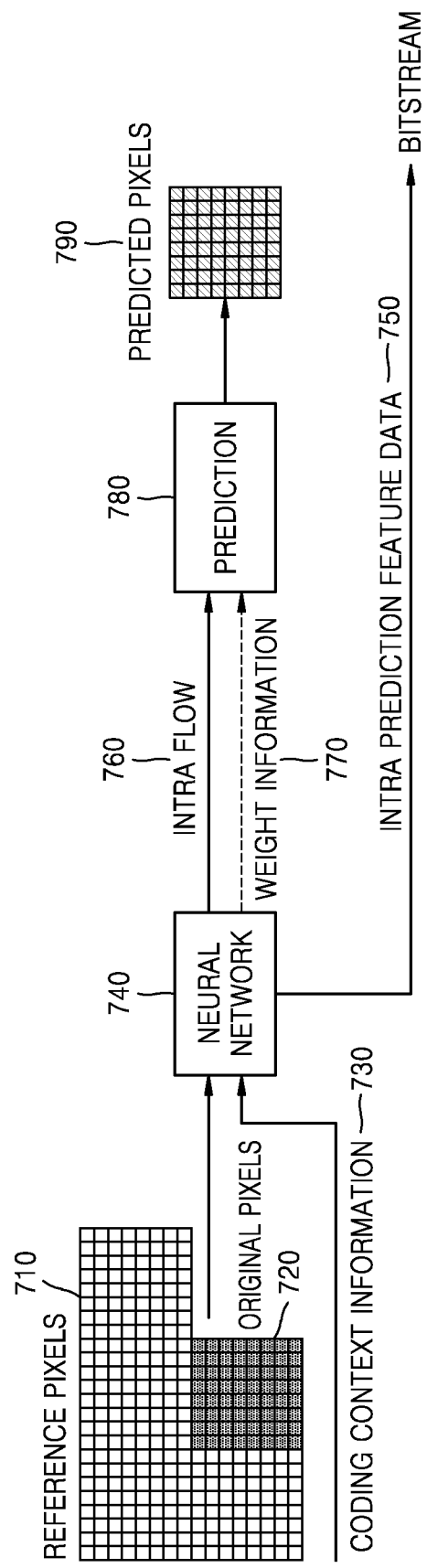
FIG. 7 is a schematic diagram illustrating an image encoding method according to an embodiment of the disclosure.

FIG. 7 is a schematic diagram illustrating an image encoding method according to an embodiment of the disclosure.

As illustrated in FIG. 7, according to an embodiment of the disclosure, original pixels 720 of a current block, reference pixels 710 located around the current block, and coding context information 730 may be input to a neural network 740, and the neural network 740 may output an intra flow 760. Although FIG. 7 illustrates a plurality of original pixels and a plurality of reference pixels 710, the disclosure is not limited thereto, and as such, according to an embodiment of the disclosure, an original pixel of the current block, a reference pixel located in the vicinity of the original pixel, and the coding context information 730 may be input to the neural network 740. According to an embodiment of the disclosure, only an intra flow 760 may be obtained from the neural network 740. However, the disclosure is not limited thereto, and as such, the neural network 760 may output other information along with the intra flow 760. For example, an intra flow 760 and weight information 770 may be obtained from the neural network 740. According to an embodiment of the disclosure, predicted pixels 790 may be obtained by performing prediction 780 by using the intra flow 760. Alternatively, an intra flow 760 and weight information 770 may be obtained from the neural network 740, and predicted pixels 790 may be obtained by performing prediction 780 by using the intra flow 760 and the weight information 770. In this case, intra prediction feature data 750 may be entropy-encoded from the neural network 740 through cost calculation and a resulting bitstream may be transmitted to the decoding apparatus. The cost calculation may be Sum of Transform Difference (SATD) or Rate Distortion Optimization (RDO) calculation.

According to an embodiment of the disclosure, the precision of the intra flow 760 may be a fractional pixel such as a ½ pell (half-pel) or a ¼ pell (quarter-pel) when the weight information is not used.

The precision of the intra flow 760 may be a pixel precision directly indicating the reference pixel when the weight information is used.

Figure 8:
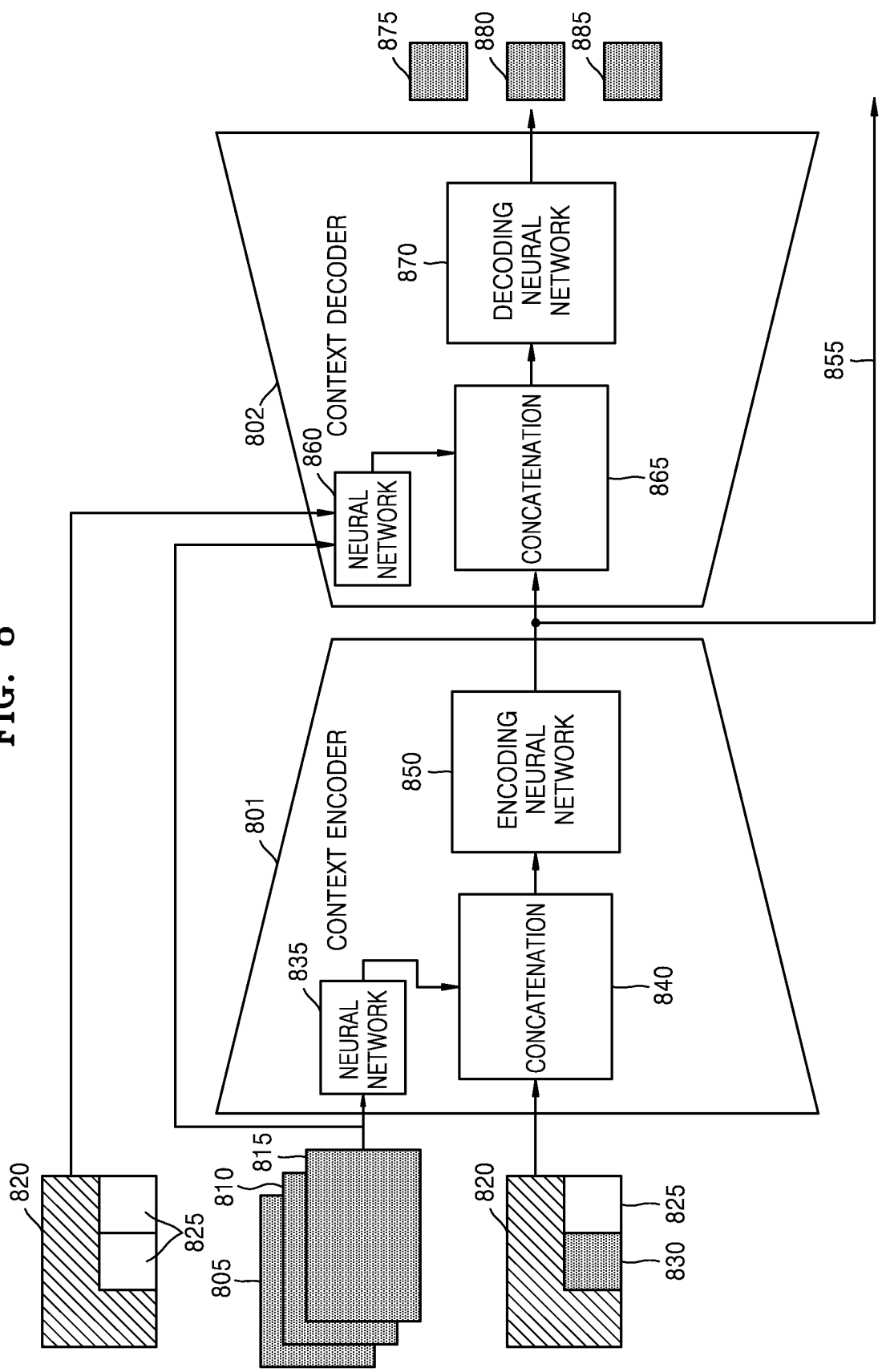
FIG. 8 is a diagram for describing a neural network used in an image encoding method according to an embodiment of the disclosure.

FIG. 8 is a diagram for describing a neural network used in an image encoding method according to an embodiment of the disclosure.

Referring to FIG. 8, a quantization parameter 805, a temporal layer 810, and a split tree structure 815 may be used as coding context information input to a context encoder 801, and original pixels 830 of a current block, reference pixels 820 located around (or surrounding) the current block, and zero pixels 825 having a sample value of 0 in an uncoded area of a neighboring block may be used as pixel information input to the context encoder 801.

According to an embodiment of the disclosure, because the coding context information 805, 810, and 815 are in a different domain than the pixel values of the pixel information, it may need to be processed through a neural network 835 to the same size as the pixel information 820, 830, and 825 before being input to an encoding neural network 850. Here, the neural network 835 may be a general convolutional neural network (CNN). Also, the neural network 835 may be a recurrent neural network (RNN). However, this is merely an example and the disclosure is not limited thereto.

The pixel information 820, 830, and 825 and the coding context information 805, 810, and 815 output from the neural network 835 may be concatenated (840) and input to the encoding neural network 850.

Intra prediction feature data 855 in the form of a feature map may be output from the encoding neural network 850.

When the size of the pixel information including the reference pixels 820, the zero pixels 825, and the original pixels 830 is H×W×C (where H is the height of the pixel information, W is the width of the pixel information, and C is the channel of the pixel information, for example, the value of C is 1 in the case of a luma component), the size of the intra prediction feature data 855 that is feature map data may be restricted to h×w×c (where "h" is smaller than H, "w" is smaller than W, and "c" is a predetermined number). Generally, "h" may be H/16 and "w" may be W/16. Here, "c" may be determined as a greater "c" when the bit rate is high. However, the disclosure is not limited thereto.

According to an embodiment of the disclosure, because the intra prediction feature data 855 is transmitted as a bitstream, and because it is inefficient to transmit the intra prediction feature data 855 when the size of the intra prediction feature data 855 is large, the intra prediction feature data 855 may be restricted to a suitable size.

According to an embodiment of the disclosure, because the intra prediction feature data 855 is entropy-encoded and transmitted, the intra prediction feature data 855 may include feature map data output as a result of the encoding neural network 850 and additional information representing the probability distribution of feature map data required for entropy decoding. The intra prediction feature data 855 may be input to a context decoder 802 together with the coding context information 805, 810, and 815 and the pixel information including the reference pixels 820 and the zero pixels 825. Here, the original pixels 830 are not input to the context decoder 802, and instead, additional zeros pixels 825 may be input into the context decoder 802. According to an embodiment of the disclosure, because the pixel information 820 and 825 and the coding context information 805, 810, and 815 are in a different domain than the intra prediction feature data 855, they may be processed to the same size as the intra prediction feature data 855 through the neural network 860 and then concatenated (865) with the intra prediction feature data 855 and input to a decoding neural network 870. Here, the neural network 860 may be a general convolutional neural network (CNN). Also, the neural network 860 may be a recurrent neural network (RNN). However, this is merely an example and the disclosure is not limited thereto.

An x component 875 of the intra flow, a y component 880 of the intra flow, and weight information 885 may be obtained from the decoding neural network 870.

According to an embodiment of the disclosure, instead of the x component 875 of the intra flow and the y component 880 of the intra flow, the angle component and size component of the intra flow may be obtained.

According to an embodiment of the disclosure, only the angle component of the intra flow may be obtained from the decoding neural network 870.

According to an embodiment of the disclosure, only the x component 875 of the intra flow and the y component 880 of the intra flow may be obtained from the decoding neural network 870.

According to an embodiment of the disclosure, the intra prediction feature data 855 output from the encoding neural network 850 may be transmitted in the form of a bitstream to the decoding apparatus.

Figure 9:
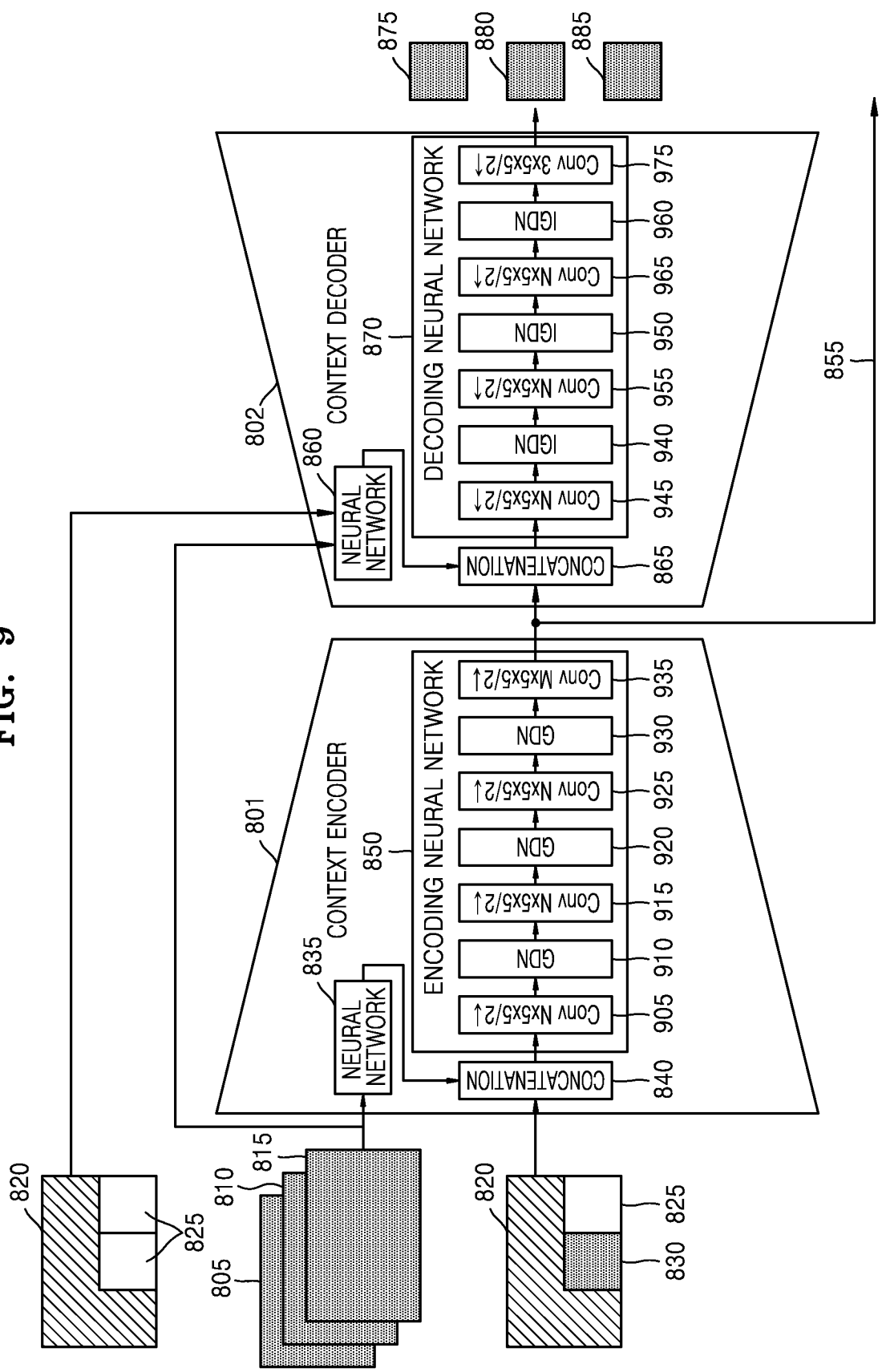
FIG. 9 illustrates an example of a structure of an encoding neural network and a structure of a decoding neural network of FIG. 8.

FIG. 9 illustrates an example of a structure of an encoding neural network and a structure of a decoding neural network of FIG. 8.

Referring to FIG. 9, in the encoding neural network 850 of FIG. 8, input data that are the coding context information 805, 810, and 815 and the pixel information 820, 825, and 830 may be input to a first convolution layer 905. In the first convolution layer 905, "N×5×5/2 ↓" indicates that the convolution process is a convolution process of downsampling at a stride interval of 2 by using N filter kernels with a size of 5×5. Here, N is an integer.

Feature data generated by the first convolution layer 905 may represent unique characteristics of the input data. For example, each feature data may represent a vertical direction characteristic, a horizontal direction characteristic, or an edge characteristic of the input data.

The feature data of the first convolution layer 905 may be input to a first generalized divisive normalization (GDN) layer 910. A sigmoid function, a tanh function, a rectified linear unit (ReLU) function, or the like may be used instead of the first GDN layer 910; however, the disclosure is not limited thereto.

The first GDN layer 910 may assign a nonlinear characteristic to each feature data.

Assigning the nonlinear characteristic by the first GDN layer 910 may mean changing and outputting some sample values of the feature data. In this case, the change may be performed by applying a nonlinear characteristic.

The first GDN layer 910 may determine whether to transmit the sample values of the feature data to a second convolution layer 915. For example, some sample values among the sample values of the feature data may be activated by the first GDN layer 910 and transmitted to the second convolution layer 915, and some other sample values of the feature data may be deactivated by the first GDN layer 910 and not transmitted to the second convolution layer 915. Unique characteristics of the input data represented by the feature data may be emphasized by the first GDN layer 910.

The feature data output from the first GDN layer 910 may be input to the second convolution layer 915. In the second convolution layer 915, "N×5×5/2 ↓" indicates that the convolution process is a convolution process of downsampling at a stride interval of 2 by using N filter kernels with a size of 5×5.

The output of the second convolution layer 915 may be input to a second GDN layer 920. The second GDN layer 920 may assign a nonlinear characteristic to the input feature data.

The feature data output from the second GDN layer 920 may be input to a third convolution layer 925. In the third convolution layer 925, "N×5×5/2 ↓" indicates that the convolution process is a convolution process of downsampling at a stride interval of 2 by using N filter kernels with a size of 5×5.

The output of the third convolution layer 925 may be input to a third GDN layer 930. The third GDN layer 930 may assign a nonlinear characteristic to the input feature data.

The feature data output from the third GDN layer 930 may be input to a fourth convolution layer 935. In the fourth convolution layer 935, "N×5×5/2 ↓" indicates that the convolution process is a convolution process of downsampling at a stride interval of 2 by using M filter kernels with a size of 5×5.

Intra prediction feature data 855 in the form of a feature map may be output from the fourth convolution layer 935.

FIG. 9 illustrates that according to an embodiment of the disclosure, the encoding neural network 850 includes four convolution layers (the first convolution layer 905, the second convolution layer 915, the third convolution layer 925, and the fourth convolution layer 935) and three GDN layers (the first GDN layer 910, the second GDN layer 920, and the third GDN layer 930). However, this is merely an example and as such, according to an embodiment of the disclosure, the number of convolution layers and GDN layers included in the encoding neural network 850 may be variously modified.

Also, referring to FIG. 9, in the decoding neural network 870 of FIG. 8, input data that are the coding context information 805, 810, and 815, the pixel information 820 and 825, and the intra prediction feature data 855 may be input to a fifth convolution layer 945. In the fifth convolution layer 945, "N×5×5/2 ↑" indicates that the convolution process is a convolution process of upsampling at a stride interval of 2 by using N filter kernels with a size of 5×5.

Feature data generated by the fifth convolution layer 945 may represent unique characteristics of the input data. For example, each feature data may represent a vertical direction characteristic, a horizontal direction characteristic, or an edge characteristic of the input data.

The feature data of the fifth convolution layer 945 may be input to a first inverse generalized divisive normalization (IGDN) layer 940. A sigmoid function, a tanh function, a rectified linear unit (ReLU) function, or the like may be used instead of the first IGDN layer 940; however, the disclosure is not limited thereto.

The first IGDN layer 940 may assign a nonlinear characteristic to each feature data.

Assigning the nonlinear characteristic by the first IGDN layer 940 may mean changing and outputting some sample values of the feature data. In this case, the change may be performed by applying a nonlinear characteristic.

The first IGDN layer 940 may determine whether to transmit the sample values of the feature data to a sixth convolution layer 955. For example, some sample values among the sample values of the feature data may be activated by the first IGDN layer 940 and transmitted to the sixth convolution layer 955, and some other sample values thereof may be deactivated by the first IGDN layer 940 and not transmitted to the sixth convolution layer 955. Unique characteristics of the input data represented by the feature data may be emphasized by the first IGDN layer 940.

The feature data output from the first IGDN layer 940 may be input to the sixth convolution layer 955. In the sixth convolution layer 955, "N×5×5/2 ↑" indicates that the convolution process is a convolution process of upsampling at a stride interval of 2 by using N filter kernels with a size of 5×5.

The output of the sixth convolution layer 955 may be input to a second IGDN layer 950. The second IGDN layer 950 may assign a nonlinear characteristic to the input feature data.

The feature data output from the second IGDN layer 950 may be input to a seventh convolution layer 965. In seventh convolution layer 965, "N×5×5/2 ↓" indicates that the convolution process is a convolution process of upsampling at a stride interval of 2 by using N filter kernels with a size of 5×5.

The output of the seventh convolution layer 965 may be input to a third IGDN layer 960. The third IGDN layer 960 may assign a nonlinear characteristic to the input feature data.

The feature data output from the third IGDN layer 960 may be input to an eighth convolution layer 975. In the eighth convolution layer 945, "3×5×5/2 ↑" indicates that the convolution process is a convolution process of upsampling at a stride interval of 2 by using 3 filter kernels with a size of 5×5.

An x component 875 of the intra flow, a y component 880 of the intra flow, and weight information 885 may be output from the eighth convolution layer 975. FIG. 9 illustrates that the decoding neural network 870 includes four convolution layers (the fifth convolution layer 945, the sixth convolution layer 955, the seventh convolution layer 965, and the eighth convolution layer 975) and three IGDN layers (the first IGDN layer 940, the second IGDN layer 950, and the third IGDN layer 960); however, this is merely an example and in an embodiment of the disclosure, the number of convolution layers and IGDN layers included in the decoding neural network 870 may be variously modified.

The above structure of the neural networks of FIG. 9 is merely an example and the disclosure is not limited thereto.

Figure 10:
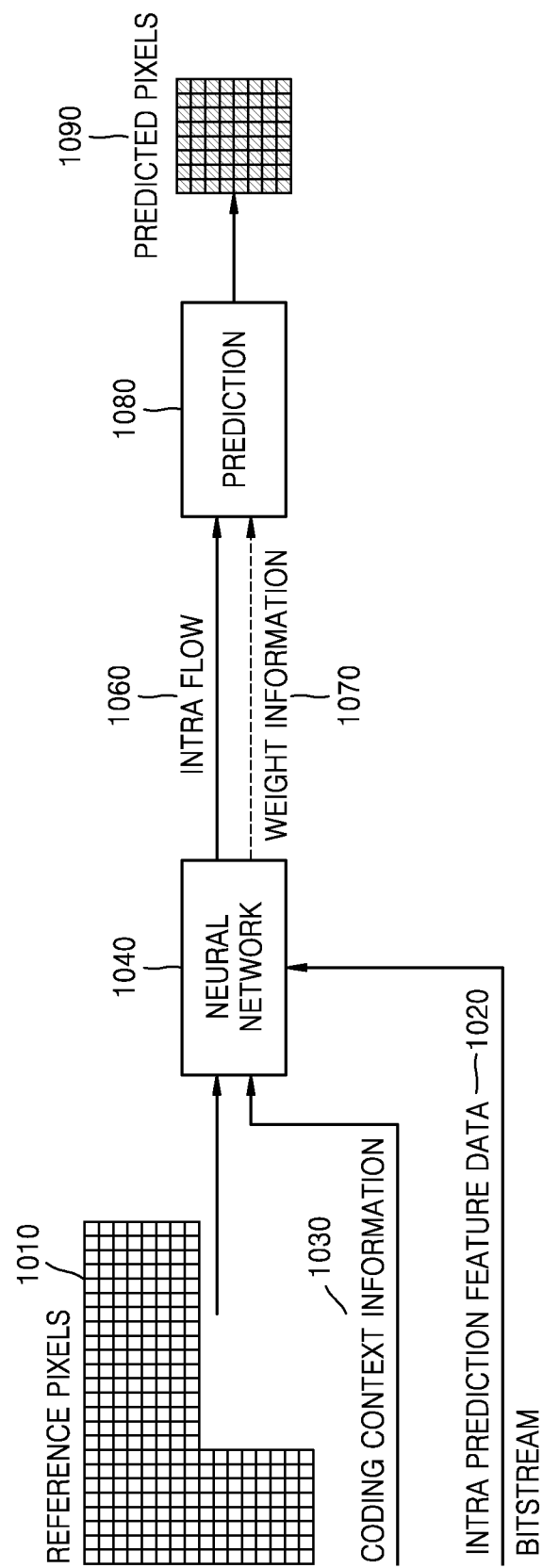
FIG. 10 is a schematic diagram illustrating an image decoding method according to an embodiment of the disclosure.

FIG. 10 is a schematic diagram illustrating an image decoding method according to an embodiment of the disclosure.

As illustrated in FIG. 10, intra prediction feature data 1020 of a current block, reference pixels 1010 located around the current block, and coding context information 1030 may be input to a neural network 1040. According to an embodiment of the disclosure, the neural network 1040 may output only an intra flow 1060. However, the disclosure is not limited thereto, and as such, according to an embodiment of the disclosure, the neural network 1040 may output the intra flow 1060 along with other information. For example, the neural network 1040 may output the intra flow 1060 and the weight information 1070. According to an embodiment of the disclosure, in a case only the intra flow 1060 is obtained from the neural network 1040, a predicted pixel 1090 may be obtained by performing prediction 1080 by using the intra flow 1060. Alternatively, in case, the intra flow 1060 and the weight information 1070 is obtained from the neural network 1040, the predicted pixel 1090 may be obtained by performing prediction 1080 by using the intra flow 1060 and the weight information 1070. In this case, the intra prediction feature data 1020 obtained from the bitstream may be entropy-decoded and input to the neural network 1040.

The precision of the intra flow 1060 may be a fractional pixel such as a ½ pell (half-pel) or a ¼ pell (quarter-pel) when the weight information is not used.

The precision of the intra flow 1060 may be a pixel precision directly indicating the reference pixel when the weight information is used.

Figure 11:
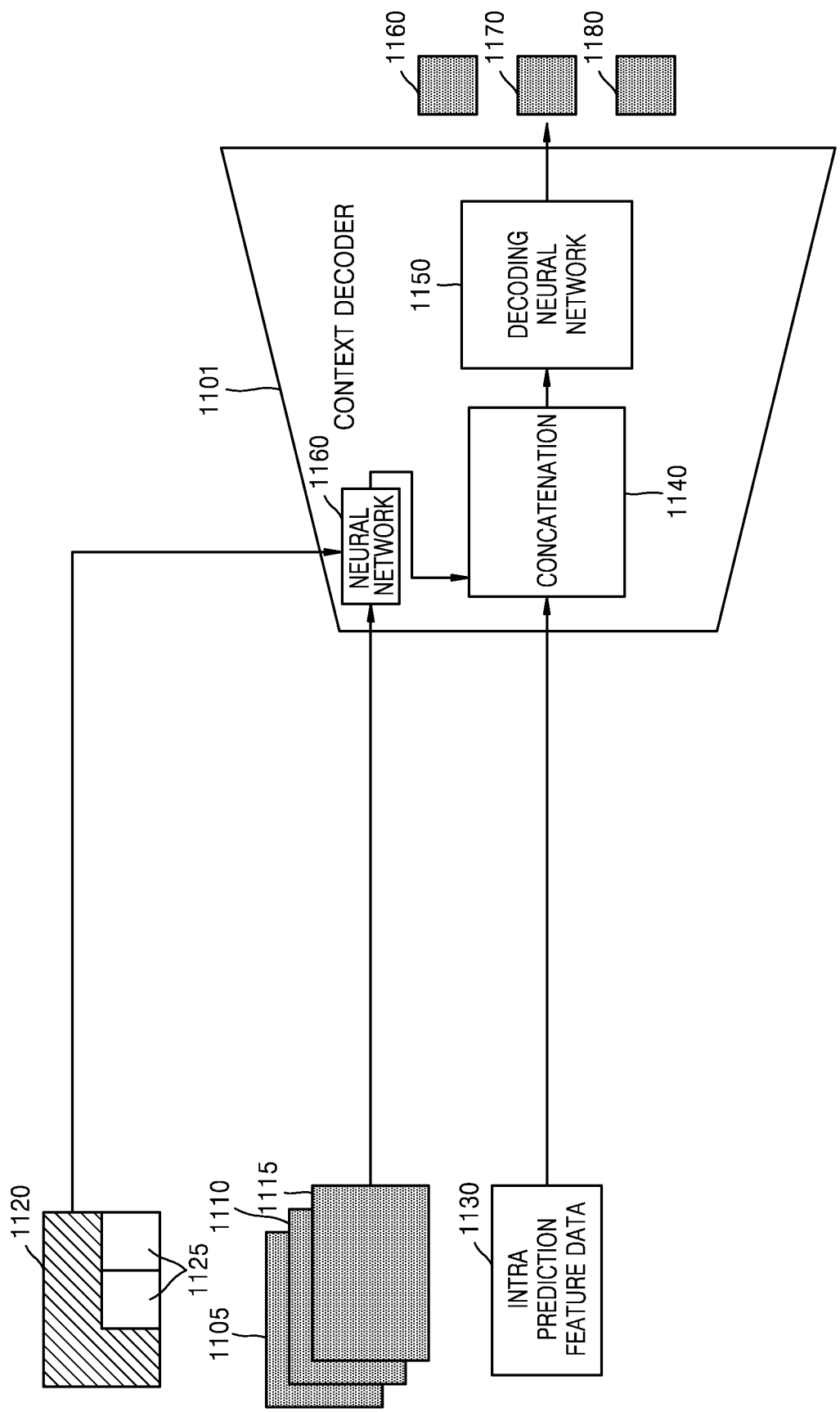
FIG. 11 is a diagram for describing a neural network used in an image decoding method according to an embodiment of the disclosure.

FIG. 11 is a diagram for describing a neural network used in an image decoding method according to an embodiment of the disclosure.

According to an embodiment of the disclosure, a context decoder 1101 of FIG. 11 may be the same as the context decoder 802 of FIG. 8.

Referring to FIG. 11, intra prediction feature data 1130 in the form of a feature map may be obtained from a bitstream. The intra prediction feature data 1130 may be input to the context decoder 1101 together with coding context information 1105, 1110, and 1115 and pixel information corresponding to reference pixels 1120 and zero pixels 1125. Here, the coding context information 1105, 1110, and 1115 and the pixel information 1120 and 1125 may be processed through a neural network 1160 to the same size as the intra prediction feature data 1130 and then concatenated (1140) with the intra prediction feature data 1130 and input to a decoding neural network 1150. Here, the neural network 1160 may be a general convolutional neural network (CNN). Also, the neural network 1160 may be a recurrent neural network (RNN). However, this is merely an example and the disclosure is not limited thereto.

An x component 1160 of the intra flow, a y component 1170 of the intra flow, and weight information 1180 may be obtained from the decoding neural network 1150.

Also, instead of the x component 1160 of the intra flow and the y component 1170 of the intra flow, the angle component and size component of the intra flow may be obtained.

Also, only the angle component of the intra flow may be obtained from the decoding neural network 1150.

Also, only the x component 1160 of the intra flow and the y component 1170 of the intra flow may be obtained from the decoding neural network 1150.

Figure 12:
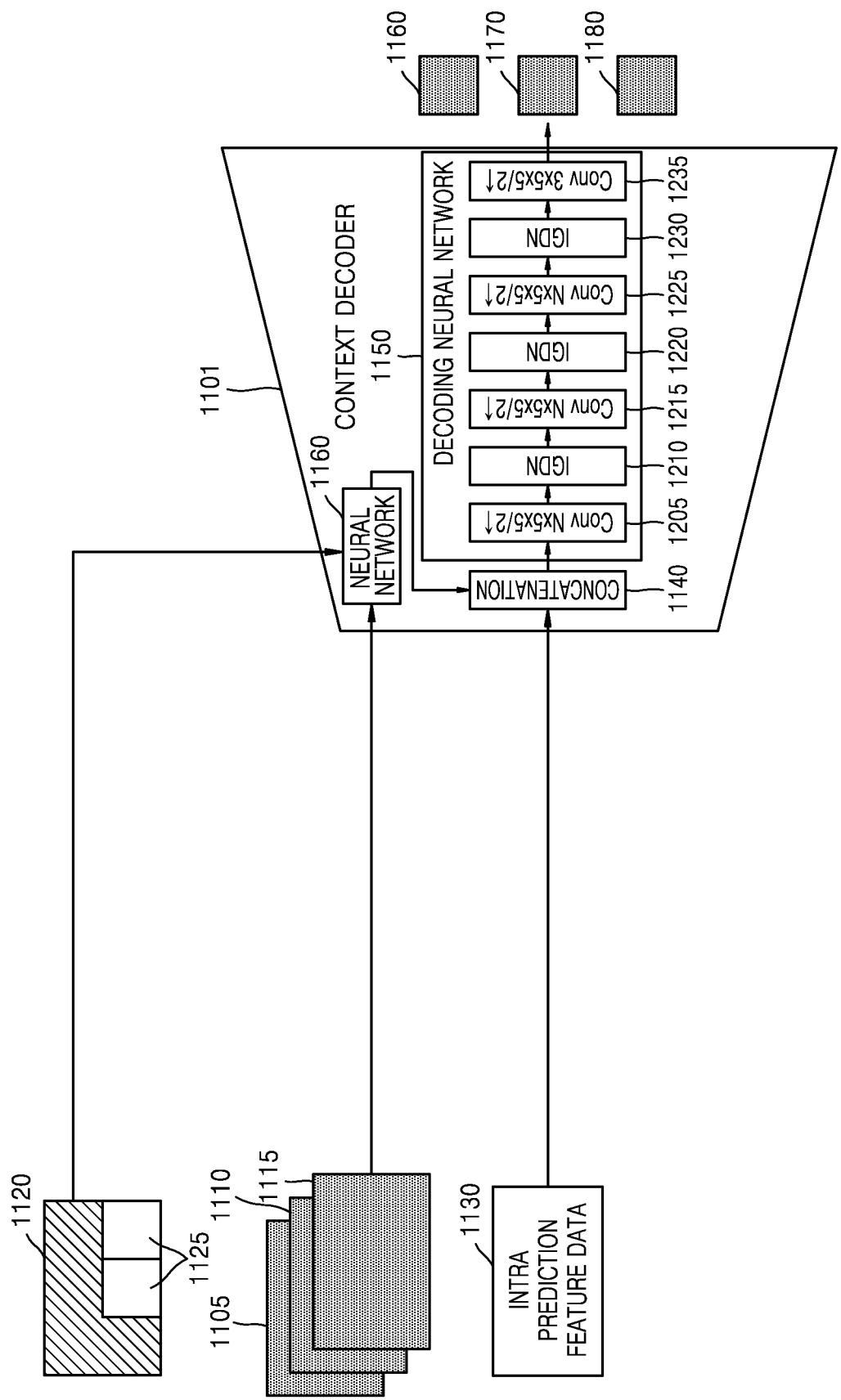
FIG. 12 illustrates an example of a structure of a decoding neural network of FIG. 11.

FIG. 12 illustrates an example of a structure of the decoding neural network of FIG. 11.

The structure of the decoding neural network 1150 of FIG. 11 may be the same as the structure of the decoding neural network 870 of FIG. 8.

Referring to FIG. 12, in the decoding neural network 1150 of FIG. 11, input data that are the coding context information 1105, 1110, and 1115, the pixel information 1120 and 1125, and the intra prediction feature data 1130 may be input to a first convolution layer 1205. In the first convolution layer 1205, "N×5×5/2 ↑" indicates that the convolution process is a convolution process of upsampling at a stride interval of 2 by using N filter kernels with a size of 5×5. Here, N is an integer.

Feature data generated by the first convolution layer 1205 may represent unique characteristics of the input data. For example, each feature data may represent a vertical direction characteristic, a horizontal direction characteristic, or an edge characteristic of the input data.

The feature data of the first convolution layer 1205 may be input to a first inverse generalized divisive normalization (IGDN) layer 1210. A sigmoid function, a tanh function, a rectified linear unit (ReLU) function, or the like may be used instead of the first IGDN layer 1210; however, the disclosure is not limited thereto.

The first IGDN layer 1210 may assign a nonlinear characteristic to each feature data.

Assigning the nonlinear characteristic by the first IGDN layer 1210 may mean changing and outputting some sample values of the feature data. In this case, the change may be performed by applying a nonlinear characteristic.

The first IGDN layer 1210 may determine whether to transmit the sample values of the feature data to a second convolution layer 1215. For example, some sample values among the sample values of the feature data may be activated by the first IGDN layer 1210 and transmitted to the second convolution layer 1215, and some other sample values thereof may be deactivated by the first IGDN layer 1210 and not transmitted to the second convolution layer 1215. Unique characteristics of the input data represented by the feature data may be emphasized by the first IGDN layer 1210.

The feature data output from the first IGDN layer 1210 may be input to the second convolution layer 1215. In the second convolution layer 1215, "N×5×5/2 ↑" indicates that the convolution process is a convolution process of upsampling at a stride interval of 2 by using N filter kernels with a size of 5×5.

The output of the second convolution layer 1215 may be input to a second IGDN layer 1220. The second IGDN layer 1220 may assign a nonlinear characteristic to the input feature data.

The feature data output from the second IGDN layer 1220 may be input to a third convolution layer 1225. In the third convolution layer 1225, "N×5×5/2 ↑" indicates that the convolution process is a convolution process of upsampling at a stride interval of 2 by using N filter kernels with a size of 5×5.

The output of the third convolution layer 1225 may be input to a third IGDN layer 1230. The third IGDN layer 1230 may assign a nonlinear characteristic to the input feature data.

The feature data output from the third IGDN layer 1230 may be input to a fourth convolution layer 1235. In the fourth convolution layer 1234, "3×5×5/2 ↑" indicates that the convolution process is a convolution process of upsampling at a stride interval of 2 by using 3 filter kernels with a size of 5×5.

An x component 1160 of the intra flow, a y component 1170 of the intra flow, and weight information 1180 may be output from the fourth convolution layer 1235. FIG. 12 illustrates that the decoding neural network 1150 includes four convolution layers (the first convolution layer 1205, the second convolution layer 1215, the third convolution layer 1225, and the fourth convolution layer 1235) and three IGDN layers (the first IGDN layer 1210, the second IGDN layer 1220, and the third IGDN layer 1230); however, this is merely an example and in an embodiment of the disclosure, the number of convolution layers and IGDN layers included in the decoding neural network 1150 may be variously modified.

The above structure of the neural network of FIG. 12 is merely an example and the disclosure is not limited thereto.

Figure 13:
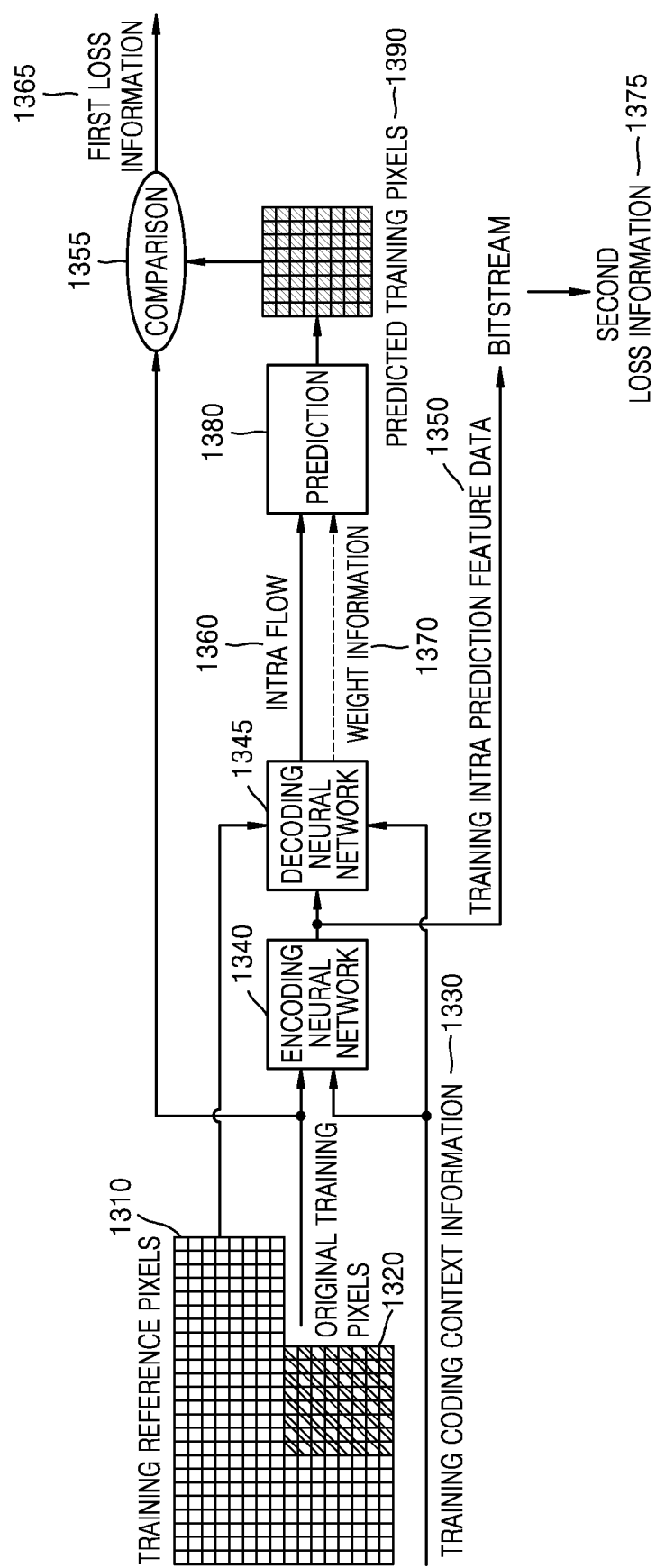
FIG. 13 is a diagram for describing a method of training neural networks used in an image encoding method and an image decoding method according to an embodiment of the disclosure.

FIG. 13 is a diagram for describing a method of training neural networks used in an image encoding method and an image decoding method according to an embodiment of the disclosure.

Referring to FIG. 13, an encoding neural network 1340 and a decoding neural network 1345 may be trained by using original training pixels 1320, reference training pixels 1310, and training coding context information 1330.

Particularly, the original training pixels 1320, the reference training pixels 1310, and the training coding context information 1330 may be input to the encoding neural network 1340 to obtain training intra prediction feature data 1350. The training intra prediction feature data 1350, the reference training pixels 1310, and the training coding context information 1330 may be input to the decoding neural network 1345 to obtain an intra flow 1360 and weight information 1370. When prediction 1380 is performed based on the intra flow 1360 and the weight information 1370, predicted training pixels 1390 may be obtained. Alternatively, the training intra prediction feature data 1350, the reference training pixels 1310, and the training coding context information 1330 may be input to the decoding neural network 1345 to obtain only the intra flow 1360, and when prediction 1380 is performed based on the intra flow 1360, predicted training pixels 1390 may be obtained.

In the training process of FIG. 13, through comparison 1355, the neural networks may be trained such that the predicted training pixels 1390 becomes as similar as possible to the original training pixels 1320 and the bit rate of the bitstream generated through encoding of the training intra prediction feature data 1350 is minimized. For this purpose, as illustrated in FIG. 13, first loss information 1365 and second loss information 1375 may be used to train the neural networks.

The first loss information 1365 may correspond to the difference between the original training pixels 1320 and the predicted training pixels 1390. In an embodiment of the disclosure, the difference between the original training pixels 1320 and the predicted training pixels 1390 may include at least one of the L1-norm value, L2-norm value, structural similarity (SSIM) value, peak signal-to-noise ratio-human vision system (PSNR-HVS) value, multiscale SSIM (MS-SSIM) value, variance inflation factor (VIF) value, or video multimethod assessment fusion (VMAF) value between the original training pixels 1320 and the predicted training pixels 1390.

Because the first loss information 1365 is related to the quality of a reconstructed image using the predicted training pixels 1390, it may also be referred to as quality loss information.

The second loss information 1375 may be calculated from the bit rate of a bitstream generated as a result of encoding the training intra prediction feature data.

Because the second loss information 1375 is related to coding efficiency of the training intra prediction feature data, the second loss information may also be referred to as compression loss information.

The encoding neural network 1340 and the decoding neural network 1345 may be trained to reduce or minimize the final loss information derived from at least one of the first loss information 1365 or the second loss information 1375.

In an embodiment of the disclosure, the encoding neural network 1340 and the decoding neural network 1345 may reduce or minimize the final loss information while changing the value of a preset parameter.

In an embodiment of the disclosure, the final loss information may be calculated according to Equation 2 below.

$$\text{Final loss information} = a \times \text{First loss information} + b \times \text{Second loss information} \quad \text{[Equation 2]}$$

In Equation 2, "a" and "b" are weights respectively applied to the first loss information 1365 and the second loss information 1375.

According to Equation 2, it may be seen that the encoding neural network 1340 and the decoding neural network 1345 are trained such that the training predicted pixel becomes as similar as possible to the training original pixel and the size of the bitstream is minimized.

The intra flow may be trained to adapt to the coding scheme and video content. The weight information may also be dynamically trained to adapt to the coding scheme and video content.

The training process described with reference to FIG. 13 may be performed by a training apparatus. The training apparatus may be, for example, an image encoding apparatus 1900 or a separate server. The parameters obtained as a result of the training may be stored in the image encoding apparatus 1900 and an image decoding apparatus 1700.

Figure 14:
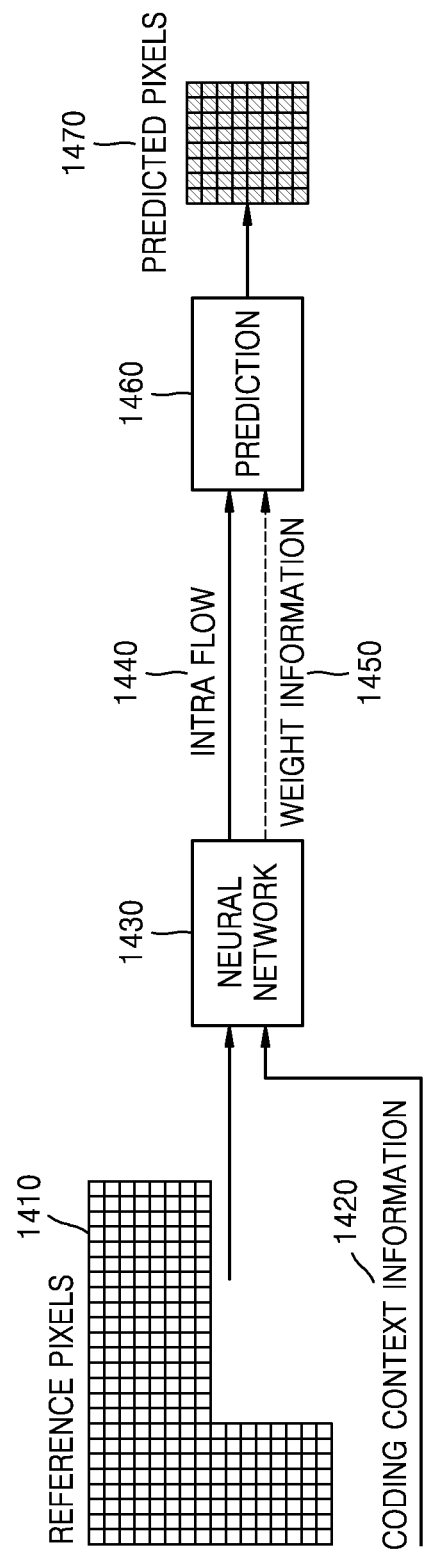
FIG. 14 is a schematic diagram illustrating an image encoding method and an image decoding method according to an embodiment of the disclosure.

FIG. 14 is a schematic diagram illustrating an image encoding method and an image decoding method according to an embodiment of the disclosure.

Unlike the image decoding method of FIG. 7 and the image encoding method of FIG. 10, because the image decoding method of FIG. 14 does not have information obtained from the bitstream and the image encoding method of FIG. 14 does not have signaling information, the image decoding method and the image encoding method of FIG. 14 may be performed in the same way.

As illustrated in FIG. 14, reference pixels 1410 located around a current block and coding context information 1420 may be input to a neural network 1430. An intra flow 1440 and weight information 1450 may be obtained from the neural network 1430, and predicted pixels 1470 may be obtained by performing prediction 1460 by using the intra flow 1440 and the weight information 1450.

The neural network 1430 may be a convolutional neural network. Also, the neural network 1430 may be a recurrent neural network (RNN). However, this is merely an example and the disclosure is not limited thereto.

Figure 15:
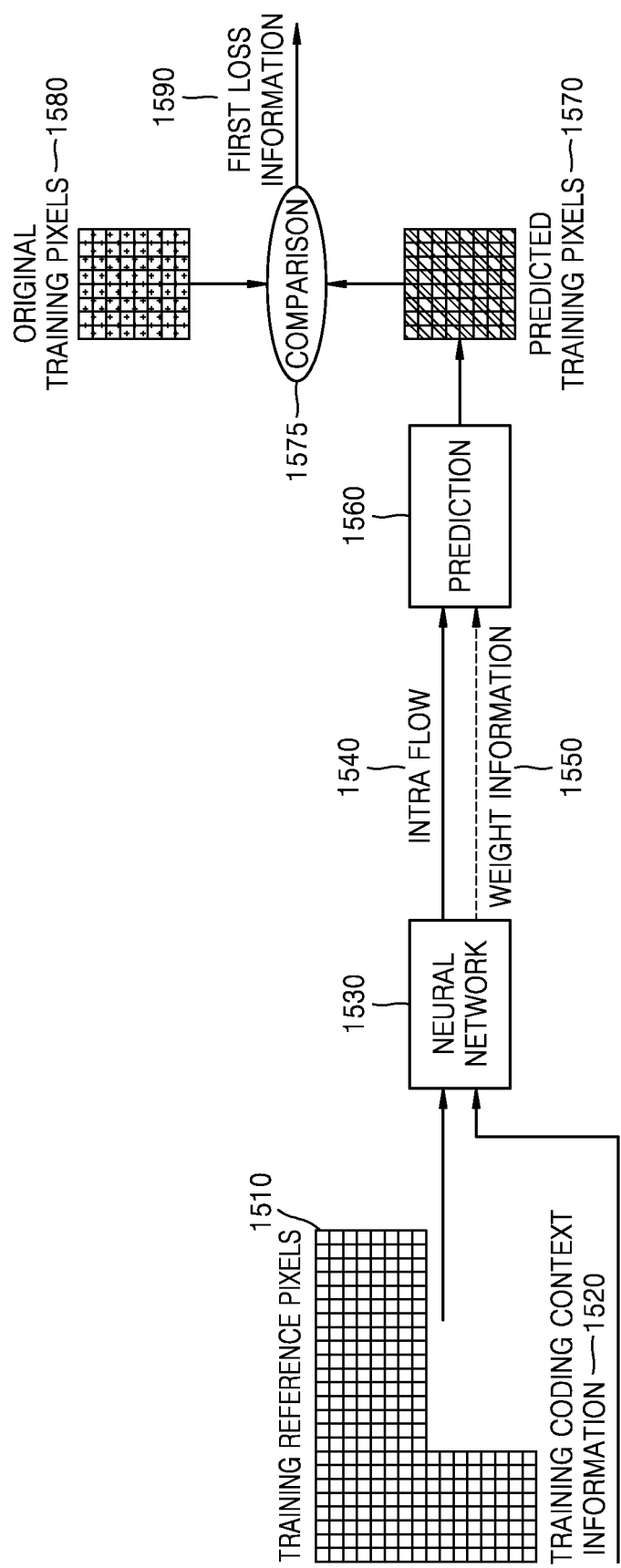
FIG. 15 is a diagram for describing a method of training a neural network used in an image encoding method and an image decoding method according to an embodiment of the disclosure.

FIG. 15 is a diagram for describing a method of training the neural network of FIG. 14.

Referring to FIG. 15, a neural network 1530 may be trained by using reference training pixels 1510 and training coding context information 1520.

For example, the reference training pixels 1510 and the training coding context information 1520 may be input to the neural network 1530 to obtain an intra flow 1540 and weight information 1550. When prediction 1560 is performed based on the intra flow 1540 and the weight information 1550, predicted training pixels 1570 may be obtained.

In the training process of FIG. 15, through comparison 1575, the neural network 1530 may be trained such that the predicted training pixels 1570 becomes as similar as possible to original training pixels 1580. For this purpose, as illustrated in FIG. 15, first loss information 1590 may be used to train the neural network 1530. According to an embodiment of the disclosure, the reference training pixels 1510, the predicted training pixels 1570 and the original training pixels 1580 may include one or more pixels.

The first loss information 1590 may correspond to the difference between the original training pixels 1580 and the predicted training pixels 1570. In an embodiment of the disclosure, the difference between the original training pixels 1580 and the predicted training pixels 1570 may include at least one of the L1-norm value, L2-norm value, structural similarity (SSIM) value, peak signal-to-noise ratio-human vision system (PSNR-HVS) value, multiscale SSIM (MS-SSIM) value, variance inflation factor (VIF) value, or video multimethod assessment fusion (VMAF) value between the original training pixels 1580 and the predicted training pixels 1570.

Because the first loss information 1590 is related to the quality of a reconstructed image using the predicted training pixels 1570, it may also be referred to as quality loss information.

The neural network 1530 may be trained to reduce or minimize the final loss information derived from the first loss information 1590.

In an embodiment of the disclosure, the neural network 1530 may reduce or minimize the final loss information while changing the value of a preset parameter.

In an embodiment of the disclosure, the final loss information may be calculated according to Equation 3 below.

Final loss information=c×First loss information    [Equation 3]

In Equation 3, "c" is a weight applied to the first loss information 1590.

According to Equation 3, it may be seen that the neural network 1530 is trained such that the training predicted pixel becomes as similar as possible to the training original pixel.

The training process described with reference to FIG. 15 may be performed by a training apparatus. The training apparatus may be, for example, an image encoding apparatus 2300 or a separate server. The parameters obtained as a result of the training may be stored in the image encoding apparatus 2300 and an image decoding apparatus 2100.

Figure 16:
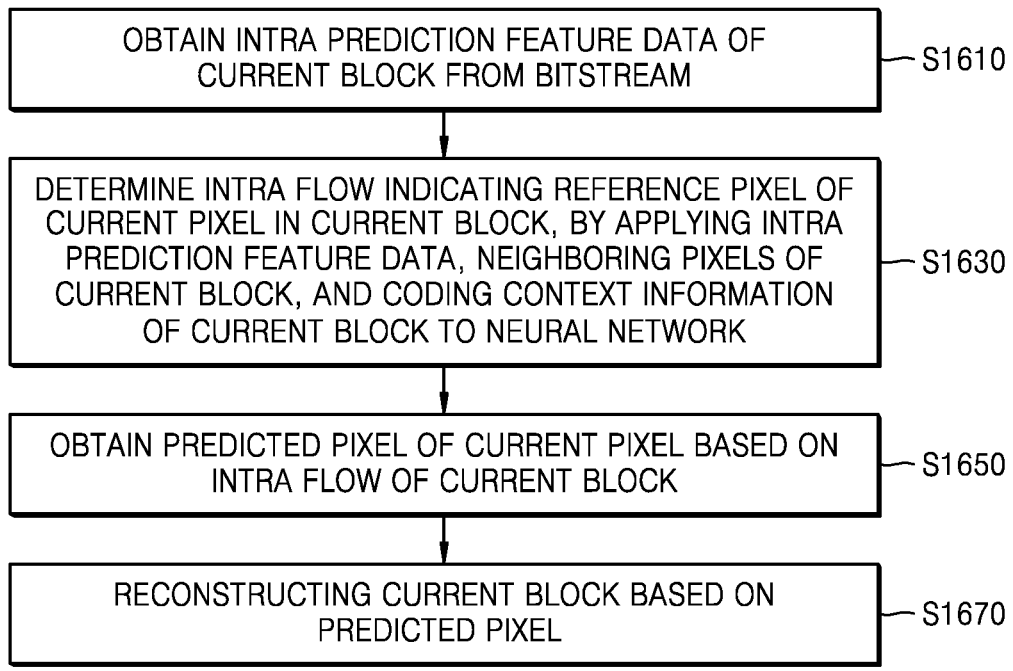
FIG. 16 is a flowchart illustrating an image decoding method according to an embodiment of the disclosure.

FIG. 16 is a flowchart illustrating an image decoding method according to an embodiment of the disclosure.

Referring to FIG. 16, in operation S1610, the image decoding apparatus 1700 may obtain intra prediction feature data of a current block from a bitstream.

In operation S1630, the image decoding apparatus 1700 may determine an intra flow indicating a reference pixel of a current pixel in the current block, by applying the intra prediction feature data, neighboring pixels of the current block, and coding context information of the current block to a neural network.

According to an embodiment of the disclosure, by applying the intra prediction feature data, the neighboring pixels of the current block, and the coding context information of the current block to the neural network, the image decoding apparatus 1700 may determine an intra flow indicating a reference pixel of the current pixel in the current block and weight information about the reference pixel and a plurality of neighboring pixels adjacent to the reference pixel.

According to an embodiment of the disclosure, the neural network may output the intra flow with an input of the intra prediction feature data, the reference pixel, and the coding context information.

According to an embodiment of the disclosure, the intra flow may be represented by one of a vector including an x component and a y component, a vector including a size component and an angle component, or an angle with respect to the reference pixel indicated by the current pixel.

According to an embodiment of the disclosure, the intra prediction feature data may be determined through neural network-based encoding.

According to an embodiment of the disclosure, the coding context information may include at least one of a quantization parameter of the current block, a temporal layer of the current block, a split structure of the current block, a split structure of the neighboring pixels, or a transformation type of the neighboring pixel. According to an embodiment of the disclosure, the split structure information of the current block and the split structure information of the neighboring pixels may indicate how the current block and the neighboring pixels are split (or divided) with respect to a frame of an image. Moreover, the split structure information may further include hierarchy information indicating a level of the split (or division) within a tree structure as illustrated in FIG. 2.

According to an embodiment of the disclosure, the coding context information may be obtained through neural network-based encoding.

In operation S1650, the image decoding apparatus 1700 may obtain a predicted pixel of the current pixel based on the intra flow of the current block.

According to an embodiment of the disclosure, the image decoding apparatus 1700 may additionally obtain weight information about a reference pixel indicated by the intra flow and a plurality of neighboring pixels adjacent to the reference pixel from the neural network and obtain predicted pixels based on a weighted average using the weight information, the reference pixel, and the plurality of neighboring pixels.

According to an embodiment of the disclosure, the precision of the intra flow may be a fractional pixel such as a ½ pell (half-pel) or a ¼ pell (quarter-pel) when the weight information is not obtained.

According to an embodiment of the disclosure, the precision of the intra flow may be a pixel precision directly indicating the reference pixel when the weight information is additionally obtained.

In operation S1670, the image decoding apparatus 1700 may reconstruct the current block based on the predicted pixel.

Figure 17:
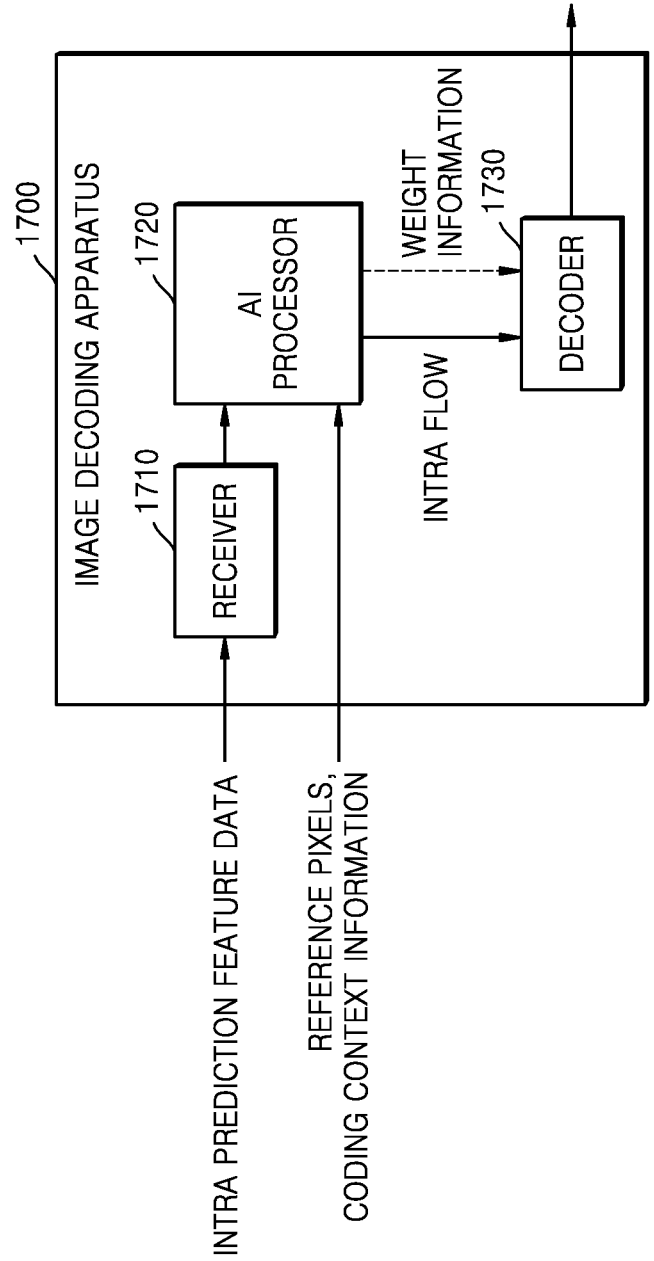
FIG. 17 is a diagram illustrating a configuration of an image decoding apparatus according to an embodiment of the disclosure.

FIG. 17 is a diagram illustrating a configuration of an image decoding apparatus according to an embodiment of the disclosure.

Referring to FIG. 17, the image decoding apparatus 1700 may include a receiver 1710, an artificial intelligence (AI) processor 1720, and a decoder 1730. However, the disclosure is not limited thereto, and as such, the image decoding apparatus 1700 may omit some of the components illustrated in FIG. 17 or may include other components. For example, the image decoding apparatus 1700 may include a memory.

The receiver 1710, the AI processor 1720, and the decoder 1730 may be implemented as a processor. The receiver 1710, the AI processor 1720, and the decoder 1730 may operate according to the instruction stored in a memory.

FIG. 17 illustrates the receiver 1710, the AI processor 1720, and the decoder 1730 separately, however, the receiver 1710, the AI processor 1720, and the decoder 1730 may be implemented through a single processor. In this case, the receiver 1710, the AI processor 1720, and the decoder 1730 may be implemented through a dedicated processor or through a combination of software and a general-purpose processor such as an application processor (AP), a central processing unit (CPU), or a graphic processing unit (GPU). Also, the dedicated processor may include a memory for implementing an embodiment of the disclosure or a memory processor for using an external memory.

The receiver 1710, the AI processor 1720, and the decoder 1730 may be implemented as a plurality of processors. In this case, the receiver 1710, the AI processor 1720, and the decoder 1730 may be implemented through a combination of dedicated processors or through a combination of software and a plurality of general-purpose processors such as an AP, a CPU, or a GPU. Also, the processor may include a dedicated AI processor. As another example, the dedicated AI processor may be configured as a separate chip from the processor.

The receiver 1710 may obtain intra prediction feature data of a current block from a bitstream. Also, the receiver 1710 may entropy-decode the intra prediction feature data and transmit the result thereof to the AI processor 1720.

Also, the AI processor 1720 may obtain a reference pixel and coding context information.

The AI processor 1720 may determine an intra flow indicating a reference pixel of a current pixel in the current block, by applying the intra prediction feature data, neighboring pixels of the current block, and coding context information of the current block to a neural network.

By applying the intra prediction feature data, the neighboring pixels of the current block, and the coding context information of the current block to the neural network, the AI processor 1720 may determine an intra flow indicating a reference pixel of the current pixel in the current block and weight information about the reference pixel and a plurality of neighboring pixels adjacent to the reference pixel.

The AI processor 1720 may transmit the intra flow to the decoder 1730.

The AI processor 1720 may transmit the intra flow and the weight information to the decoder 1730.

The decoder 1730 may obtain a predicted pixel of the current pixel based on the intra flow of the current block. Also, the decoder 1730 may reconstruct the current block based on the predicted pixel.

The decoder 1730 may obtain a predicted pixel of the current pixel based on the weight information and the intra flow of the current block.

The bitstream may be transmitted from the image encoding apparatus 1900 through the network. In an embodiment of the disclosure, the bitstream may be stored in a data storage medium including a magnetic medium such as a hard disk, a floppy disk, and a magnetic tape, an optical recording medium such as a CD-ROM and a DVD, and/or a magneto-optical medium such as a floptical disk.

Figure 18:
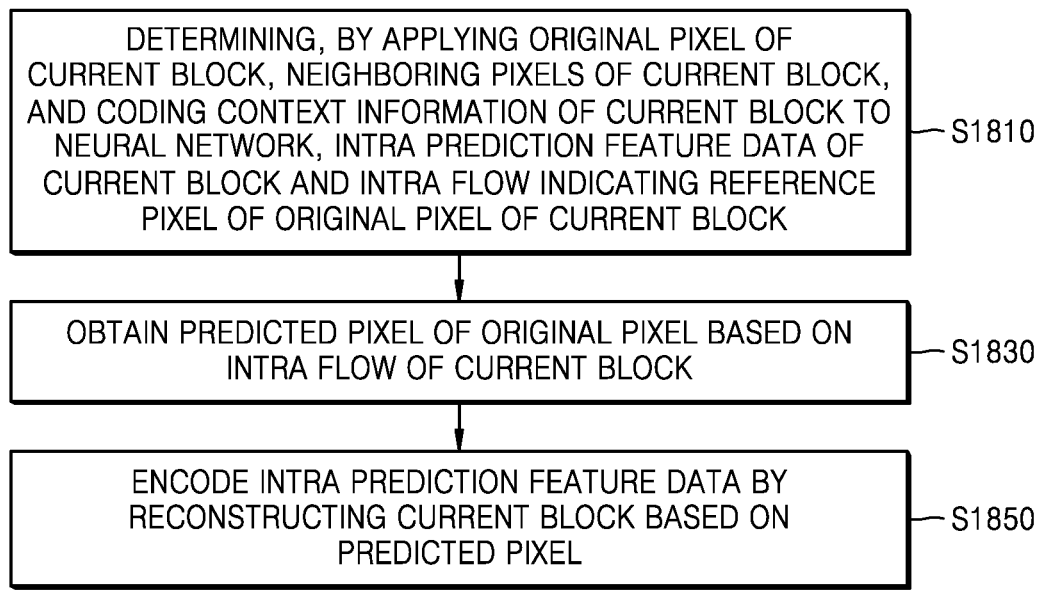
FIG. 18 is a flowchart illustrating an image encoding method according to an embodiment of the disclosure.

FIG. 18 is a flowchart illustrating an image encoding method according to an embodiment of the disclosure.

Referring to FIG. 18, in operation S1810, by applying an original pixel of a current block, neighboring pixels of the current block, and coding context information of the current block to a neural network, the image encoding apparatus 1900 may determine intra prediction feature data of the current block and an intra flow indicating a reference pixel of an original pixel of the current block.

According to an embodiment of the disclosure, by applying the original pixel of the current block, the neighboring pixels of the current block, and the coding context information of the current block to the neural network, the image encoding apparatus 1900 may determine intra prediction feature data of the current block, an intra flow indicating a reference pixel of the original pixel of the current block and weight information about a reference pixel indicated by the intra flow and a plurality of neighboring pixels adjacent to the reference pixel.

According to an embodiment of the disclosure, the neural network may include an encoding neural network outputting the intra prediction feature data with an input of the original pixel, the reference pixel, and the coding context information, and a decoding neural network outputting the intra flow with an input of the intra prediction feature data, the reference pixel, and the coding context information.

According to an embodiment of the disclosure, the decoding neural network may further output the weight information.

According to an embodiment of the disclosure, the intra flow may be represented by one of a vector including an x component and a y component, a vector including a size component and an angle component, or an angle with respect to the reference pixel indicated by the current pixel.

According to an embodiment of the disclosure, the coding context information may include at least one of a quantization parameter of the current block, a temporal layer of the current block, a split structure of the current block, a split structure of the neighboring pixels, or a transformation type of the neighboring pixel.

In operation S1830, the image encoding apparatus 1900 may obtain a predicted pixel of the original pixel based on the intra flow of the current block.

According to an embodiment of the disclosure, the image encoding apparatus 1900 may additionally obtain weight information about a reference pixel indicated by the intra flow and a plurality of neighboring pixels adjacent the reference pixel from the neural network and obtain predicted pixels based on a weighted average using the weight information, the reference pixel, and the plurality of neighboring pixels.

According to an embodiment of the disclosure, the precision of the intra flow may be a fractional pixel such as a ½ pell (half-pel) or a ¼ pell (quarter-pel) when the weight information is not obtained.

According to an embodiment of the disclosure, the precision of the intra flow may be a pixel precision directly indicating the reference pixel when the weight information is additionally obtained.

In operation S1850, the image encoding apparatus 1900 may encode the intra prediction feature data by reconstructing the current block based on the predicted pixel.

Figure 19:
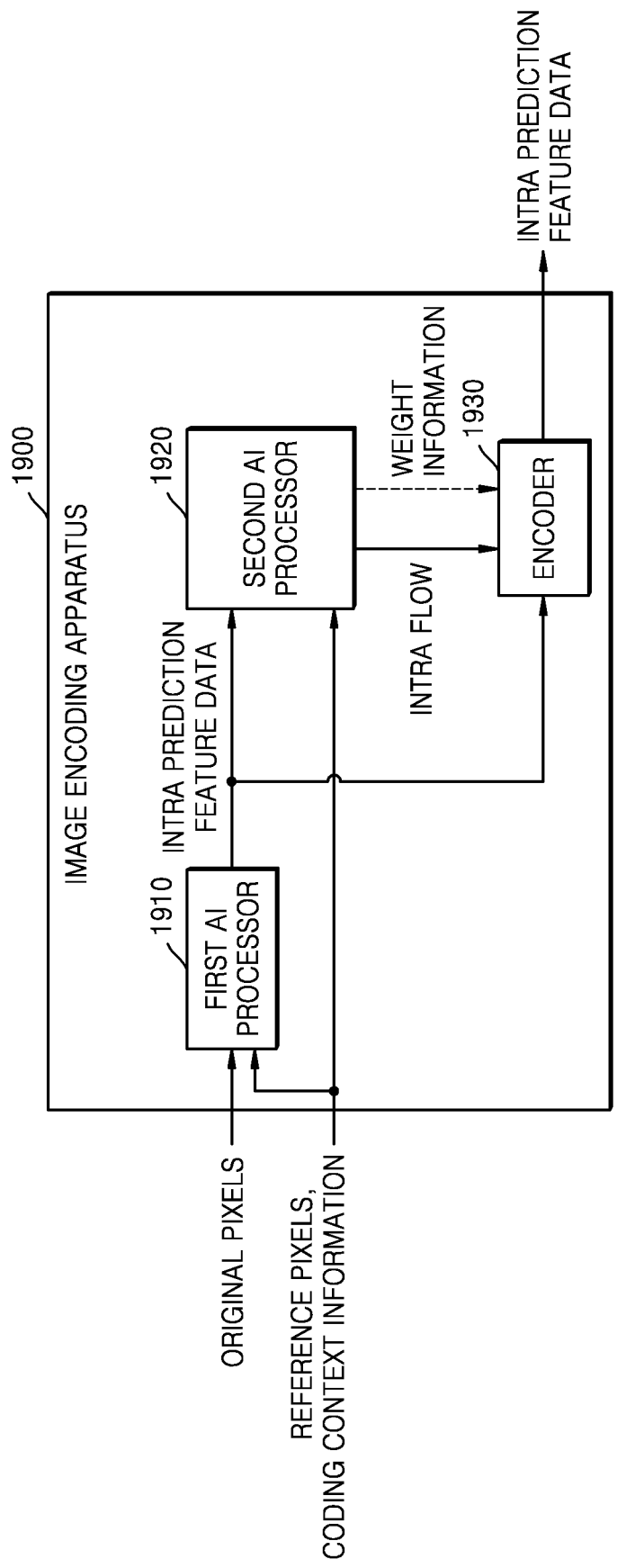
FIG. 19 is a diagram illustrating a configuration of an image encoding apparatus according to an embodiment of the disclosure.

FIG. 19 is a diagram illustrating a configuration of an image encoding apparatus according to an embodiment of the disclosure.

Referring to FIG. 19, the image encoding apparatus 1900 may include a first AI processor 1910, a second AI processor 1920, and an encoder 1930. However, the disclosure is not limited thereto, and as such, the image encoding apparatus 1900 may omit some of the components illustrated in FIG. 19 or may include other components. For example, the image encoding apparatus 1900 may include a memory.

The first AI processor 1910, the second AI processor 1920, and the encoder 1930 may be implemented as a processor. The first AI processor 1910, the second AI processor 1920, and the encoder 1930 may operate according to the instruction stored in a memory.

FIG. 19 illustrates the first AI processor 1910, the second AI processor 1920, and the encoder 1930 separately, however, the first AI processor 1910, the second AI processor 1920, and the encoder 1930 may be implemented through a single processor. In this case, the first AI processor 1910, the second AI processor 1920, and the encoder 1930 may be implemented through a dedicated processor or through a combination of software and a general-purpose processor such as an application processor (AP), a central processing unit (CPU), or a graphic processing unit (GPU). Also, the dedicated processor may include a memory for implementing an embodiment of the disclosure or a memory processor for using an external memory.

The first AI processor 1910, the second AI processor 1920, and the encoder 1930 may be implemented as a plurality of processors. In this case, the first AI processor 1910, the second AI processor 1920, and the encoder 1930 may be implemented through a combination of dedicated processors or through a combination of software and a plurality of general-purpose processors such as an AP, a CPU, or a GPU. Also, the processor may include a dedicated AI processor. As another example, the dedicated AI processor may be configured as a separate chip from the processor.

The first AI processor 1910 may determine intra prediction feature data of the current block by applying the original pixel of the current block, the neighboring pixels of the current block, and the coding context information of the current block to the encoding neural network.

The first AI processor 1910 may transmit the intra prediction feature data to the second AI processor 1920 and the encoder 1930.

Also, the second AI processor 1920 may obtain a reference pixel and coding context information.

The second AI processor 1920 may determine an intra flow indicating a reference pixel of a current pixel in the current block, by applying the intra prediction feature data, neighboring pixels of the current block, and coding context information of the current block to the decoding neural network.

By applying the intra prediction feature data, the neighboring pixels of the current block, and the coding context information of the current block to the neural network, the second AI processor 1920 may determine an intra flow indicating a reference pixel of the current pixel in the current block and weight information about the reference pixel and a plurality of neighboring pixels adjacent to the reference pixel.

The second AI processor 1920 may transmit the intra flow to the encoder 1930.

The second AI processor 1920 may transmit the intra flow and the weight information to the encoder 1930.

The encoder 1930 may obtain a predicted pixel of the current pixel based on the intra flow of the current block. Also, the encoder 1930 may encode the intra prediction feature data by reconstructing the current block based on the predicted pixel.

The encoder 1930 may obtain a predicted pixel of the current pixel based on the weight information and the intra flow of the current block. Also, the encoder 1930 may encode the intra prediction feature data by reconstructing the current block based on the predicted pixel.

The intra prediction feature data may be entropy-encoded and transmitted to the image decoding apparatus 1700.

Figure 20:
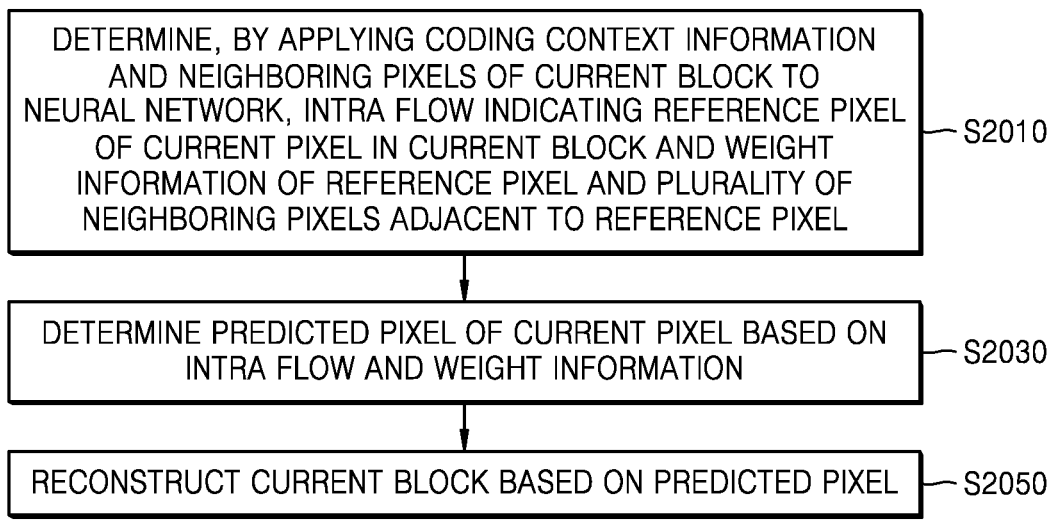
FIG. 20 is a flowchart illustrating an image decoding method according to an embodiment of the disclosure.

FIG. 20 is a flowchart illustrating an image decoding method according to an embodiment of the disclosure.

Referring to FIG. 20, in operation S2010, by applying coding context information and neighboring pixels of a current block to a neural network, the image decoding apparatus 2100 may determine an intra flow indicating a reference pixel of a current pixel in the current block and weight information of the reference pixel and a plurality of neighboring pixels adjacent to the reference pixel.

According to an embodiment of the disclosure, the neural network may be a convolutional neural network.

According to an embodiment of the disclosure, the image decoding apparatus 2100 may determine the intra flow indicating the reference pixel of the current pixel in the current block by applying the coding context information and the neighboring pixels of the current block to the neural network.

According to an embodiment of the disclosure, the precision of the intra flow may be a fractional pixel such as a ½ pell (half-pel) or a ¼ pell (quarter-pel) when the weight information is not obtained.

According to an embodiment of the disclosure, the precision of the intra flow may be a pixel precision directly indicating the reference pixel when the weight information is additionally obtained.

In operation S2030, the image decoding apparatus 2100 may determine a predicted pixel of the current pixel based on the intra flow and the weight information.

According to an embodiment of the disclosure, the image decoding apparatus 2100 may determine a predicted pixel of the current pixel based on the intra flow.

In operation S2050, the image decoding apparatus 2100 may reconstruct the current block based on the predicted pixel.

Figure 21:
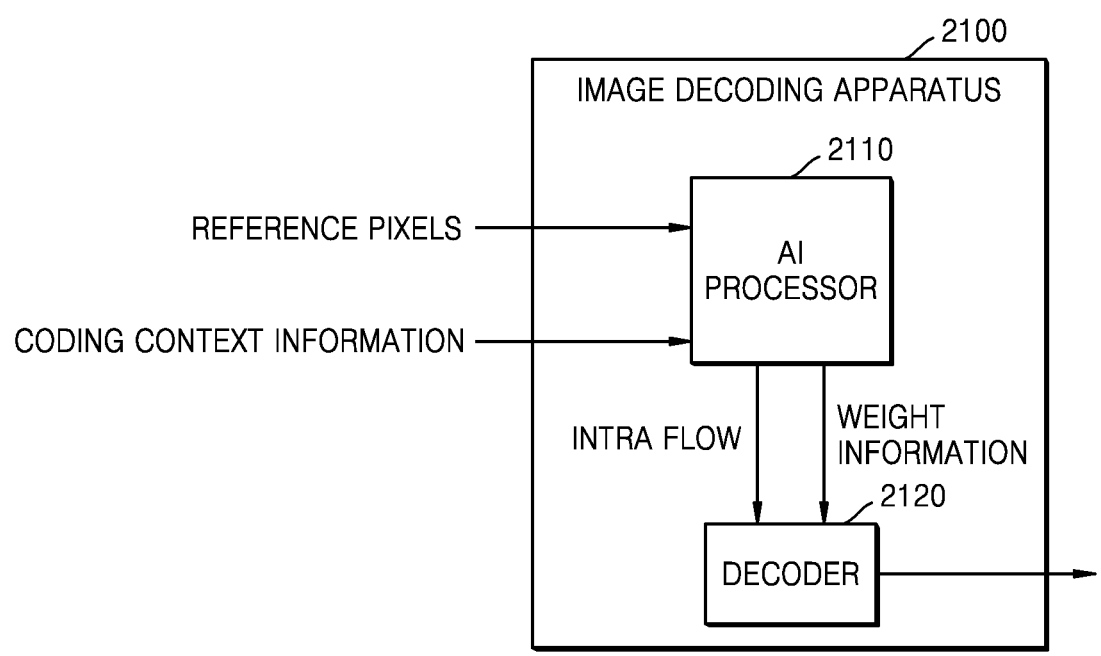
FIG. 21 is a diagram illustrating a configuration of an image decoding apparatus according to an embodiment of the disclosure.

FIG. 21 is a diagram illustrating a configuration of an image decoding apparatus according to an embodiment of the disclosure.

Referring to FIG. 21, the image decoding apparatus 2100 may include an AI processor 2110 and a decoder 2120. However, the disclosure is not limited thereto, and as such, the image decoding apparatus 2100 may include other components. For example, the image decoding apparatus 2100 may include a memory.

The AI processor 2110 and the decoder 2120 may be implemented as a processor. The AI processor 2110 and the decoder 2120 may operate according to the instruction stored in a memory.

FIG. 21 illustrates the AI processor 2110 and the decoder 2120 separately, however, the AI processor 2110 and the decoder 2120 may be implemented through a single processor. In this case, the AI processor 2110 and the decoder 2120 may be implemented through a dedicated processor or through a combination of software and a general-purpose processor such as an application processor (AP), a central processing unit (CPU), or a graphic processing unit (GPU). Also, the dedicated processor may include a memory for implementing an embodiment of the disclosure or a memory processor for using an external memory.

The AI processor 2110 and the decoder 2120 may be implemented as a plurality of processors. In this case, the AI processor 2110 and the decoder 2120 may be implemented through a combination of dedicated processors or through a combination of software and a plurality of general-purpose processors such as an AP, a CPU, or a GPU. Also, the processor may include a dedicated AI processor. As another example, the dedicated AI processor may be configured as a separate chip from the processor.

The AI processor 2110 may obtain a reference pixel of the current block and coding context information of the current block.

By applying the neighboring pixels of the current block and the coding context information of the current block to the neural network, the AI processor 2110 may determine an intra flow indicating a reference pixel of the current pixel in the current block and weight information about the reference pixel and neighboring pixels of the reference pixel.

The AI processor 2110 may transmit the intra flow and the weight information to the decoder 2120.

The decoder 2120 may obtain a predicted pixel of the current pixel based on the weight information and the intra flow of the current block. Also, the decoder 2120 may reconstruct the current block based on the predicted pixel.

Figure 22:
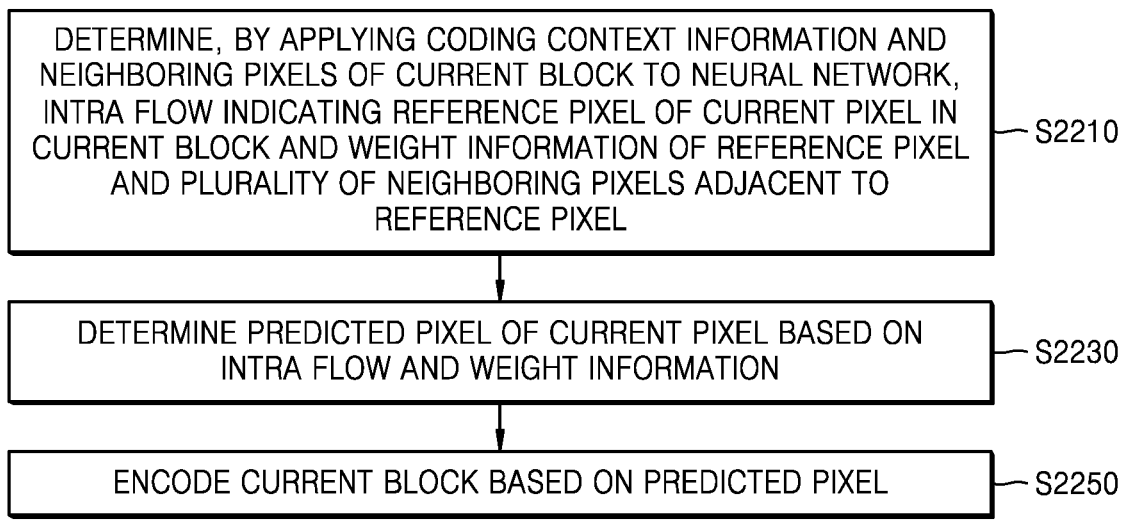
FIG. 22 is a flowchart illustrating an image encoding method according to an embodiment of the disclosure.

FIG. 22 is a flowchart illustrating an image encoding method according to an embodiment of the disclosure.

Referring to FIG. 22, in operation S2210, by applying coding context information and neighboring pixels of a current block to a neural network, the image encoding apparatus 2300 may determine an intra flow indicating a reference pixel of a current pixel in the current block and weight information of the reference pixel and a plurality of neighboring pixels adjacent to the reference pixel.

According to an embodiment of the disclosure, the neural network may be a convolutional neural network.

According to an embodiment of the disclosure, the image encoding apparatus 2300 may determine the intra flow indicating the reference pixel of the current pixel in the current block by applying the coding context information and the neighboring pixels of the current block to the neural network.

According to an embodiment of the disclosure, the precision of the intra flow may be a fractional pixel such as a ½ pell (half-pel) or a ¼ pell (quarter-pel) when the weight information is not obtained.

According to an embodiment of the disclosure, the precision of the intra flow may be a pixel precision directly indicating the reference pixel when the weight information is additionally obtained.

In operation S2230, the image encoding apparatus 2300 may determine a predicted pixel of the current pixel based on the intra flow and the weight information.

According to an embodiment of the disclosure, the image encoding apparatus 2300 may determine a predicted pixel of the current pixel based on the intra flow.

In operation S2250, the image encoding apparatus 2300 may encode the current block based on the predicted pixel.

Figure 23:
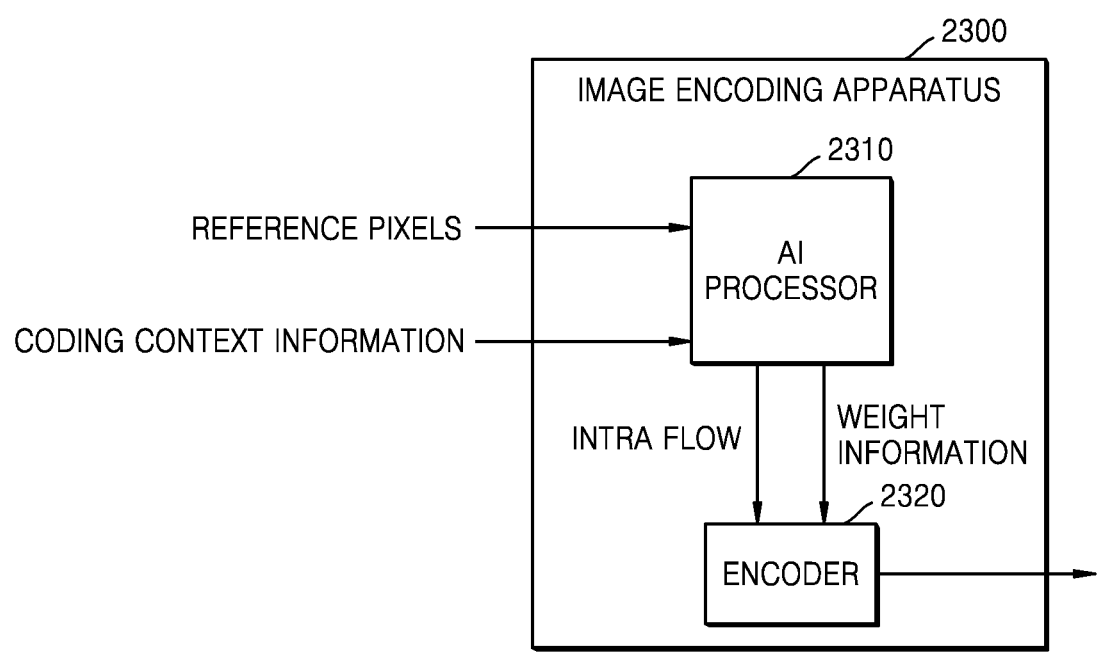
FIG. 23 is a diagram illustrating a configuration of an image encoding apparatus according to an embodiment of the disclosure.

FIG. 23 is a diagram illustrating a configuration of an image encoding apparatus according to an embodiment of the disclosure.

Referring to FIG. 23, the image encoding apparatus 2300 may include an AI processor 2310 and an encoder 2320. However, the disclosure is not limited thereto, and as such, the image encoding apparatus 2300 may include other components. For example, the image encoding apparatus 2300 may include a memory.

The AI processor 2310 and the encoder 2320 may be implemented as a processor. The AI processor 2310 and the encoder 2320 may operate according to the instruction stored in a memory.

FIG. 23 illustrates the AI processor 2310 and the encoder 2320 separately, however, the AI processor 2310 and the encoder 2320 may be implemented through a single processor. In this case, the AI processor 2310 and the encoder 2320 may be implemented through a dedicated processor or through a combination of software and a general-purpose processor such as an application processor (AP), a central processing unit (CPU), or a graphic processing unit (GPU). Also, the dedicated processor may include a memory for implementing an embodiment of the disclosure or a memory processor for using an external memory.

The AI processor 2310 and the encoder 2320 may be implemented as a plurality of processors. In this case, the AI processor 2310 and the encoder 2320 may be implemented through a combination of dedicated processors or through a combination of software and a plurality of general-purpose processors such as an AP, a CPU, or a GPU. Also, the processor may include a dedicated AI processor. As another example, the dedicated AI processor may be configured as a separate chip from the processor.

The AI processor 2310 may obtain a reference pixel of the current block and coding context information of the current block.

By applying the neighboring pixels of the current block and the coding context information of the current block to the neural network, the AI processor 2310 may determine an intra flow indicating a reference pixel of the current pixel in the current block and weight information about the reference pixel and neighboring pixels of the reference pixel.

The AI processor 2310 may transmit the intra flow and the weight information to the encoder 2320.

The encoder 2320 may obtain a predicted pixel of the current pixel based on the weight information and the intra flow of the current block. Also, the encoder 2320 may encode the current block based on the predicted pixel.

An image decoding method according to an embodiment of the disclosure may include obtaining intra prediction feature data of a current block from a bitstream, determining an intra flow indicating a reference pixel of a current pixel in the current block, by applying the intra prediction feature data, neighboring pixels of the current block, and coding context information of the current block to a neural network, obtaining a predicted pixel of the current pixel based on the intra flow of the current block, and reconstructing the current block based on the predicted pixel.

Unlike the intra prediction of the related art, according to the image decoding method according to an embodiment of the disclosure, because each prediction direction is applied to each pixel, instead of applying one prediction direction to all pixels in a block to be predicted, and a trained intra flow is obtained through the neural network with an input of intra prediction feature data, neighboring pixels, and coding context information and a predicted pixel is obtained by using the intra flow, instead of directly generating a predicted pixel through the neural network with an input of neighboring pixels, the efficiency of intra prediction may be improved by using the intra flow having a unique spatial vector indicating a reference pixel available to each pixel of a block to be predicted.

According to an embodiment of the disclosure, the obtaining of the predicted pixel of the current pixel based on the intra flow of the current block may include additionally obtaining, from the neural network, weight information about the reference pixel indicated by the intra flow and a plurality of neighboring pixels adjacent to the reference pixel, and obtaining predicted pixels based on a weighted average using the weight information, the reference pixel, and the plurality of neighboring pixels.

Unlike the intra prediction of the related art, according to the image decoding method according to an embodiment of the disclosure, because predetermined filters are not used, a trained intra flow is obtained through the neural network, and a predicted pixel is obtained by using the intra flow and trained weight information, the efficiency of intra prediction may be improved by using a weighted average based on the weight information and the intra flow.

According to an embodiment of the disclosure, the neural network may output the intra flow with an input of the intra prediction feature data, the reference pixel, and the coding context information.

According to an embodiment of the disclosure, the intra flow may be represented by one of a vector including an x component and a y component, a vector including a size component and an angle component, or an angle with respect to the reference pixel indicated by the current pixel.

According to an embodiment of the disclosure, the intra prediction feature data may be determined through neural network-based encoding.

According to an embodiment of the disclosure, the coding context information may include at least one of a quantization parameter of the current block, a temporal layer of the current block, a split structure of the current block, a split structure of the neighboring pixels, or a transformation type of the neighboring pixel.

According to an embodiment of the disclosure, the coding context information may be obtained through neural network-based encoding.

An image decoding apparatus according to an embodiment of the disclosure may include a memory storing one or more instructions, and at least one processor configured to operate according to the one or more instructions, wherein the at least one processor may be configured to obtain intra prediction feature data of a current block from a bitstream, determine an intra flow indicating a reference pixel of a current pixel in the current block, by applying the intra prediction feature data, neighboring pixels of the current block, and coding context information of the current block to a neural network, obtain a predicted pixel of the current pixel based on the intra flow of the current block, and reconstruct the current block based on the predicted pixel.

Unlike the intra prediction of the related art, according to the image decoding apparatus according to an embodiment of the disclosure, because each prediction direction is applied to each pixel, instead of applying one prediction direction to all pixels in a block to be predicted, and a trained intra flow is obtained through the neural network with an input of intra prediction feature data, neighboring pixels, and coding context information and a predicted pixel is obtained by using the intra flow, instead of directly generating a predicted pixel through the neural network with an input of neighboring pixels, the efficiency of intra prediction may be improved by using the intra flow having a unique spatial vector indicating a reference pixel available to each pixel of a block to be predicted.

According to an embodiment of the disclosure, the obtaining of the predicted pixel of the current pixel based on the intra flow of the current block may include additionally obtaining, from the neural network, weight information about the reference pixel indicated by the intra flow and a plurality of neighboring pixels adjacent to the reference pixel, and obtaining predicted pixels based on a weighted average using the weight information, the reference pixel, and the plurality of neighboring pixels.

Unlike the intra prediction of the related art, according to the image decoding apparatus according to an embodiment of the disclosure, because predetermined filters are not used, a trained intra flow is obtained through the neural network, and a predicted pixel is obtained by using the intra flow and trained weight information, the efficiency of intra prediction may be improved by using a weighted average based on the weight information and the intra flow.

According to an embodiment of the disclosure, the neural network may output the intra flow with an input of the intra prediction feature data, the reference pixel, and the coding context information.

According to an embodiment of the disclosure, the intra flow may be represented by one of a vector including an x component and a y component, a vector including a size component and an angle component, or an angle with respect to the reference pixel indicated by the current pixel.

According to an embodiment of the disclosure, the intra prediction feature data may be determined through neural network-based encoding.

According to an embodiment of the disclosure, the coding context information may include at least one of a quantization parameter of the current block, a temporal layer of the current block, a split structure of the current block, a split structure of the neighboring pixels, or a transformation type of the neighboring pixel.

According to an embodiment of the disclosure, the coding context information may be obtained through neural network-based encoding.

An image encoding method according to an embodiment of the disclosure may include determining, by applying an original pixel of a current block, neighboring pixels of the current block, and coding context information of the current block to a neural network, intra prediction feature data of the current block and an intra flow indicating a reference pixel of an original pixel of the current block, obtaining a predicted pixel of the original pixel based on the intra flow of the current block, and encoding the intra prediction feature data by reconstructing the current block based on the predicted pixel.

Unlike the intra prediction of the related art, according to the image encoding method according to an embodiment of the disclosure, because each prediction direction is applied to each pixel, instead of applying one prediction direction to all pixels in a block to be predicted, and a trained intra flow is obtained through the neural network with an input of an original pixel, neighboring pixels, and coding context information and a predicted pixel is obtained by using the intra flow, instead of directly generating a predicted pixel through the neural network with an input of neighboring pixels, the efficiency of intra prediction may be improved by using the intra flow having a unique spatial vector indicating a reference pixel available to each pixel of a block to be predicted.

According to an embodiment of the disclosure, the obtaining of the predicted pixel of the current pixel based on the intra flow of the current block may include additionally obtaining, from the neural network, weight information about the reference pixel indicated by the intra flow and a plurality of neighboring pixels adjacent to the reference pixel, and obtaining predicted pixels based on a weighted average using the weight information, the reference pixel, and the plurality of neighboring pixels.

Unlike the intra prediction of the related art, according to the image encoding method according to an embodiment of the disclosure, because predetermined filters are not used, a trained intra flow is obtained through the neural network, and a predicted pixel is obtained by using the intra flow and trained weight information, the efficiency of intra prediction may be improved by using a weighted average based on the weight information and the intra flow.

According to an embodiment of the disclosure, the neural network may include an encoding neural network outputting the intra prediction feature data with an input of the original pixel, the reference pixel, and the coding context information, and a decoding neural network outputting the intra flow with an input of the intra prediction feature data, the reference pixel, and the coding context information.

According to an embodiment of the disclosure, the decoding neural network may further output the weight information.

According to an embodiment of the disclosure, the intra flow may be represented by one of a vector including an x component and a y component, a vector including a size component and an angle component, or an angle with respect to the reference pixel indicated by the current pixel.

According to an embodiment of the disclosure, the coding context information may include at least one of a quantization parameter of the current block, a temporal layer of the current block, a split structure of the current block, a split structure of the neighboring pixels, or a transformation type of the neighboring pixel.

An image encoding apparatus according to an embodiment of the disclosure may include a memory storing one or more instructions, and at least one processor configured to operate according to the one or more instructions, wherein the at least one processor may be configured to determine, by applying an original pixel of a current block, neighboring pixels of the current block, and coding context information of the current block to a neural network, intra prediction feature data of the current block and an intra flow indicating a reference pixel of an original pixel of the current block, obtain a predicted pixel of the original pixel based on the intra flow of the current block, and encode the intra prediction feature data by reconstructing the current block based on the predicted pixel.

Unlike the intra prediction of the related art, according to the image encoding apparatus according to an embodiment of the disclosure, because each prediction direction is applied to each pixel, instead of applying one prediction direction to all pixels in a block to be predicted, and a trained intra flow is obtained through the neural network with an input of an original pixel, neighboring pixels, and coding context information and a predicted pixel is obtained by using the intra flow, instead of directly generating a predicted pixel through the neural network with an input of neighboring pixels, the efficiency of intra prediction may be improved by using the intra flow having a unique spatial vector indicating a reference pixel available to each pixel of a block to be predicted.

According to an embodiment of the disclosure, the obtaining of the predicted pixel of the current pixel based on the intra flow of the current block may include additionally obtaining, from the neural network, weight information about the reference pixel indicated by the intra flow and a plurality of neighboring pixels adjacent to the reference pixel, and obtaining predicted pixels based on a weighted average using the weight information, the reference pixel, and the plurality of neighboring pixels.

Unlike the intra prediction of the related art, according to the image encoding apparatus according to an embodiment of the disclosure, because predetermined filters are not used, a trained intra flow is obtained through the neural network, and a predicted pixel is obtained by using the intra flow and trained weight information, the efficiency of intra prediction may be improved by using a weighted average based on the weight information and the intra flow.

According to an embodiment of the disclosure, the neural network may include an encoding neural network outputting the intra prediction feature data with an input of the original pixel, the reference pixel, and the coding context information, and a decoding neural network outputting the intra flow with an input of the intra prediction feature data, the reference pixel, and the coding context information.

According to an embodiment of the disclosure, the decoding neural network may further output the weight information.

According to an embodiment of the disclosure, the intra flow may be represented by one of a vector including an x component and a y component, a vector including a size component and an angle component, or an angle with respect to the reference pixel indicated by the current pixel.

According to an embodiment of the disclosure, the coding context information may include at least one of a quantization parameter of the current block, a temporal layer of the current block, a split structure of the current block, a split structure of the neighboring pixels, or a transformation type of the neighboring pixel.

An image decoding method according to an embodiment of the disclosure may include determining, by applying coding context information and neighboring pixels of a current block to a neural network, an intra flow indicating a reference pixel of a current pixel in the current block and weight information of the reference pixel and a plurality of neighboring pixels adjacent to the reference pixel, determining a predicted pixel of the current pixel based on the intra flow and the weight information, and reconstructing the current block based on the predicted pixel.

According to the image decoding method according to an embodiment of the disclosure, because a trained intra flow and weight information are obtained through the neural network with an input of neighboring pixels and coding context information and a predicted pixel is obtained by using the intra flow and the weight information, the efficiency of intra prediction may be improved by using the weight information and the intra flow having a unique spatial vector indicating a reference pixel available to each pixel of a block to be predicted.

According to an embodiment of the disclosure, the neural network may be a convolutional neural network.

According to an embodiment of the disclosure, the intra flow indicating the reference pixel of the current pixel in the current block may be determined by applying the coding context information and the neighboring pixels of the current block to the neural network.

According to an embodiment of the disclosure, the predicted pixel of the current pixel may be determined based on the intra flow.

An image decoding apparatus according to an embodiment of the disclosure may include a memory storing one or more instructions, and at least one processor configured to operate according to the one or more instructions, wherein the at least one processor may be configured to determine, by applying coding context information and neighboring pixels of a current block to a neural network, an intra flow indicating a reference pixel of a current pixel in the current block and weight information of the reference pixel and a plurality of neighboring pixels adjacent to the reference pixel, determine a predicted pixel of the current pixel based on the intra flow and the weight information, and reconstruct the current block based on the predicted pixel.

According to the image decoding apparatus according to an embodiment of the disclosure, because a trained intra flow and weight information are obtained through the neural network with an input of neighboring pixels and coding context information and a predicted pixel is obtained by using the intra flow and the weight information, the efficiency of intra prediction may be improved by using the weight information and the intra flow having a unique spatial vector indicating a reference pixel available to each pixel of a block to be predicted.

According to an embodiment of the disclosure, the neural network may be a convolutional neural network.

According to an embodiment of the disclosure, the intra flow indicating the reference pixel of the current pixel in the current block may be determined by applying the coding context information and the neighboring pixels of the current block to the neural network.

According to an embodiment of the disclosure, the predicted pixel of the current pixel may be determined based on the intra flow.

An image encoding method according to an embodiment of the disclosure may include determining, by applying coding context information and neighboring pixels of a current block to a neural network, an intra flow indicating a reference pixel of a current pixel in the current block and weight information of the reference pixel and a plurality of neighboring pixels adjacent to the reference pixel, determining a predicted pixel of the current pixel based on the intra flow and the weight information, and encoding the current block based on the predicted pixel.

According to the image encoding method according to an embodiment of the disclosure, because a trained intra flow and weight information are obtained through the neural network with an input of neighboring pixels and coding context information and a predicted pixel is obtained by using the intra flow and the weight information, the efficiency of intra prediction may be improved by using the weight information and the intra flow having a unique spatial vector indicating a reference pixel available to each pixel of a block to be predicted.

According to an embodiment of the disclosure, the neural network may be a convolutional neural network.

According to an embodiment of the disclosure, the intra flow indicating the reference pixel of the current pixel in the current block may be determined by applying the coding context information and the neighboring pixels of the current block to the neural network.

According to an embodiment of the disclosure, the predicted pixel of the current pixel may be determined based on the intra flow.

An image encoding apparatus according to an embodiment of the disclosure may include a memory storing one or more instructions, and at least one processor configured to operate according to the one or more instructions, wherein the at least one processor may be configured to determine, by applying coding context information and neighboring pixels of a current block to a neural network, an intra flow indicating a reference pixel of a current pixel in the current block and weight information of the reference pixel and a plurality of neighboring pixels adjacent to the reference pixel, determine a predicted pixel of the current pixel based on the intra flow and the weight information, and encode the current block based on the predicted pixel.

According to the image encoding apparatus according to an embodiment of the disclosure, because a trained intra flow and weight information are obtained through the neural network with an input of neighboring pixels and coding context information and a predicted pixel is obtained by using the intra flow and the weight information, the efficiency of intra prediction may be improved by using the weight information and the intra flow having a unique spatial vector indicating a reference pixel available to each pixel of a block to be predicted.

According to an embodiment of the disclosure, the neural network may be a convolutional neural network.

According to an embodiment of the disclosure, the intra flow indicating the reference pixel of the current pixel in the current block may be determined by applying the coding context information and the neighboring pixels of the current block to the neural network.

According to an embodiment of the disclosure, the predicted pixel of the current pixel may be determined based on the intra flow.

The machine-readable storage medium may be provided in the form of a non-transitory storage medium. Here, the term "non-transitory storage medium" may mean that the storage medium is a tangible device and does not include signals (e.g., electromagnetic waves), and may mean that data may be semi-permanently or temporarily stored in the storage medium. For example, the "non-transitory storage medium" may include a buffer in which data is temporarily stored.

According to an embodiment of the disclosure, the method according to various embodiments described herein may be included and provided in a computer program product. The computer program product may be traded as a product between a seller and a buyer. The computer program product may be distributed in the form of a machine-readable storage medium (e.g., a compact disc read only memory (CD-ROM)) or may be distributed (e.g., downloaded or uploaded) online through an application store or directly between two user devices (e.g., smartphones). In the case of online distribution, at least a portion of the computer program product (e.g., a downloadable app) may be at least temporarily stored or temporarily generated in a machine-readable storage medium such as a memory of a manufacturer server, a memory of an application store server, or a memory of a relay server.

What is claimed is:

1. A neural network based image decoding method comprising:
    obtaining intra prediction feature data of a current block from a bitstream;
    obtaining intra flow information indicating a reference pixel corresponding to each pixel included in the current block, based on the intra prediction feature data, first neighboring pixels of the current block, and coding context information of the current block;
    obtaining a predicted pixel of the current block based on the intra flow information of the current block; and
    reconstructing the current block based on the predicted pixel.

2. The image decoding method of claim 1, further comprising:
    applying the intra prediction feature data, the first neighboring pixels, and the coding context information of the current block to the neural network;
    obtaining, from the neural network, the intra flow information along with weight information about the reference pixel indicated by the intra flow information and a plurality of second neighboring pixels adjacent to the reference pixel; and
    obtaining the predicted pixel based on a weighted average obtained based on the weight information, the reference pixel, and the plurality of second neighboring pixels.

3. The image decoding method of claim 1, wherein the neural network outputs the intra flow information based on the intra prediction feature data, the first neighboring pixels of the current block, and the coding context information provided as an input into the neural network.

4. The image decoding method of claim 1, wherein the intra flow information comprises one of a first vector comprising an x component and a y component, a second vector comprising a size component and an angle component, or an angle with respect to the reference pixel indicated by the each pixel.

5. The image decoding method of claim 1, wherein the intra prediction feature data is obtained through neural network-based encoding.

6. The image decoding method of claim 1, wherein the coding context information comprises at least one of a quantization parameter of the current block, a temporal layer of the current block, a split structure of the current block, a split structure of the first neighboring pixels, or a transformation type of the first neighboring pixels.

7. The image decoding method of claim 1, wherein the coding context information is obtained through neural network-based encoding.

8. A neural network based image encoding method comprising:
    obtaining, based on an original pixel of a current block, first neighboring pixels of the current block, and coding context information of the current block, intra prediction feature data of the current block and intra flow information indicating a reference pixel corresponding to each of the original pixel of the current block;
    obtaining a predicted pixel of the original pixel based on the intra flow information of the current block; and
    encoding the intra prediction feature data by reconstructing the current block based on the predicted pixel.

9. The image encoding method of claim 8, further comprising:
applying the each of the original pixel of the current block, the first neighboring pixels of the current block, and the coding context information of the current block to the neural network;
obtaining, from the neural network, the intra prediction feature data of the current block, the intra flow information, and weight information about the reference pixel indicated by the intra flow information and a plurality of second neighboring pixels adjacent to the reference pixel; and
obtaining the predicted pixel based on a weighted average obtained based on the weight information, the reference pixel, and the plurality of second neighboring pixels.

10. The image encoding method of claim 8, further comprises:
outputting the intra prediction feature data by inputting the original pixel, the reference pixel, and the coding context information into an encoding neural network, and
outputting the intra flow information by inputting the intra prediction feature data, the reference pixel, and the coding context information into a decoding neural network.

11. The image encoding method of claim 9, wherein the decoding neural network further outputs the weight information.

12. The image encoding method of claim 8, wherein the intra flow information is represented by one of a vector including an x component and a y component, a vector including a size component and an angle component, or an angle with respect to the reference pixel indicated by the each of the original pixel.

13. The image encoding method of claim 8, wherein the coding context information comprises at least one of a quantization parameter of the current block, a temporal layer of the current block, a split structure of the current block, a split structure of the first neighboring pixels, or a transformation type of the first neighboring pixels.

14. A neural network based image decoding apparatus comprising:
a memory storing one or more instructions; and
at least one processor configured to operate according to the one or more instructions to:
obtain intra prediction feature data of a current block from a bitstream,
obtain intra flow information indicating a reference pixel corresponding to each pixel included in the current block, based on the intra prediction feature data, first neighboring pixels of the current block, and coding context information of the current block,
obtain a predicted pixel of the current block based on the intra flow information of the current block, and
reconstruct the current block based on the predicted pixel.

15. A neural network based image decoding method comprising:
obtaining, based on coding context information and first neighboring pixels of a current block, intra flow information indicating a reference pixel corresponding to each pixel included in the current block and weight information of the reference pixel and a plurality of second neighboring pixels adjacent to the reference pixel;
obtaining a predicted pixel of the current block based on the intra flow information and the weight information; and
reconstructing the current block based on the predicted pixel.

* * * * *